US009625091B1

(12) United States Patent
Massey

(10) Patent No.: US 9,625,091 B1
(45) Date of Patent: Apr. 18, 2017

(54) ADJUSTABLE MOUNTING SYSTEMS FOR TELEVISIONS

(71) Applicant: Kurt William Massey, Mooresville, NC (US)

(72) Inventor: Kurt William Massey, Mooresville, NC (US)

( * ) Notice: Subject to any disclaimer, the term of this patent is extended or adjusted under 35 U.S.C. 154(b) by 0 days.

(21) Appl. No.: 14/563,842

(22) Filed: Dec. 8, 2014

Related U.S. Application Data

(60) Provisional application No. 61/913,195, filed on Dec. 6, 2014.

(51) Int. Cl.
*E04G 3/00* (2006.01)
*F16M 13/02* (2006.01)
*F16M 11/04* (2006.01)

(52) U.S. Cl.
CPC .......... *F16M 13/022* (2013.01); *F16M 11/04* (2013.01); *F16M 13/02* (2013.01)

(58) Field of Classification Search
USPC ....... 248/917, 919, 920, 921, 922, 923, 371, 248/284.1; 361/679.22
See application file for complete search history.

(56) References Cited

U.S. PATENT DOCUMENTS

| | | |
|---|---|---|
| 2,090,439 A | 8/1937 | Carwardine |
| 2,630,854 A | 3/1953 | Neher |
| 4,076,351 A | 2/1978 | Wyant |
| 4,082,244 A | 4/1978 | Groff |
| 4,561,674 A | 12/1985 | Alessio |
| 4,691,886 A | 9/1987 | Wendling et al. |
| 5,037,054 A | 8/1991 | McConnell |
| 5,108,063 A | 4/1992 | Koerber, Sr. et al. |
| 5,224,677 A | 7/1993 | Close |
| 5,299,993 A | 4/1994 | Habing |
| 5,499,956 A | 3/1996 | Habing et al. |
| 5,560,501 A | 10/1996 | Rupert |
| 5,738,316 A | 4/1998 | Sweere et al. |
| 5,743,503 A | 4/1998 | Voeller et al. |
| 5,826,846 A | 10/1998 | Buccieri et al. |
| 5,857,756 A | 1/1999 | Fehre |
| 5,876,008 A | 3/1999 | Sweere et al. |
| 6,065,725 A | 5/2000 | Mason |
| 6,065,909 A | 5/2000 | Cook |
| 6,105,909 A | 8/2000 | Wirth et al. |
| 6,419,196 B1 | 7/2002 | Sweere et al. |
| 6,523,796 B2 | 2/2003 | Abramowsky et al. |

(Continued)

FOREIGN PATENT DOCUMENTS

GB 2222939 A 3/1990

OTHER PUBLICATIONS

U.S. Appl. No. 13/118,297, by Massey K; filed May 27, 2011.
U.S. Appl. No. 14/229,780, by Massey K; filed Mar. 28, 2014.

*Primary Examiner* — Steven Marsh
(74) *Attorney, Agent, or Firm* — Perkins Coie LLP

(57) ABSTRACT

A mounting system capable of mounting objects to support structures. The mounting system includes a wall mount including a display bracket configured to hold the object, a fixed support bracket coupleable to a vertical support structure, and a linkage assembly. The linkage assembly has a low-profile stowed configuration in which the object is held in a raised position close to the support structure. Tilt adjustment mechanisms are used to adjust the tilt of the display bracket.

22 Claims, 24 Drawing Sheets

(56) References Cited

U.S. PATENT DOCUMENTS

| | | |
|---|---|---|
| 6,592,090 B1 | 7/2003 | Li |
| 6,695,274 B1 | 2/2004 | Chiu |
| 6,889,404 B2 | 5/2005 | Lu et al. |
| 6,905,101 B1 | 6/2005 | Dittmer |
| 6,983,917 B2 | 1/2006 | Oddsen, Jr. |
| 7,014,157 B2 | 3/2006 | Oddsen |
| 7,061,753 B2 | 6/2006 | Michoux et al. |
| 7,252,277 B2 | 8/2007 | Sweere et al. |
| 7,290,744 B2 | 11/2007 | Baldasari |
| 7,300,029 B2 | 11/2007 | Petrick et al. |
| 7,395,996 B2 | 7/2008 | Dittmer |
| 7,398,950 B2 | 7/2008 | Hung |
| 7,448,584 B2 * | 11/2008 | Chen ............... F16M 11/10 248/122.1 |
| 7,546,745 B2 | 6/2009 | Lee et al. |
| 7,546,994 B2 | 6/2009 | Altonji et al. |
| 7,854,415 B2 | 12/2010 | Holbrook et al. |
| 7,866,622 B2 | 1/2011 | Dittmer |
| 7,950,613 B2 | 5/2011 | Anderson et al. |
| 8,074,950 B2 | 12/2011 | Clary |
| 8,382,052 B1 | 2/2013 | Mathieson et al. |
| 8,724,037 B1 | 5/2014 | Massey |
| 8,864,092 B2 * | 10/2014 | Newville ............ F16M 11/08 248/123.11 |
| 2002/0043978 A1 | 4/2002 | McDonald et al. |
| 2002/0100851 A1 | 8/2002 | Abramowsky et al. |
| 2004/0084587 A1 | 5/2004 | Oddsen et al. |
| 2005/0204645 A1 | 9/2005 | Bachinski et al. |
| 2006/0070210 A1 | 4/2006 | Amdahl et al. |
| 2006/0102819 A1 | 5/2006 | Li et al. |
| 2007/0023599 A1 * | 2/2007 | Fedewa ............. F16M 11/10 248/284.1 |
| 2007/0030405 A1 | 2/2007 | Childrey et al. |
| 2007/0040084 A1 | 2/2007 | Sturman et al. |
| 2007/0221807 A1 | 9/2007 | Park et al. |
| 2007/0252056 A1 | 11/2007 | Novin et al. |
| 2008/0078906 A1 | 4/2008 | Hung et al. |
| 2008/0237424 A1 | 10/2008 | Clary |
| 2009/0034178 A1 | 2/2009 | Le et al. |
| 2009/0050763 A1 | 2/2009 | Dittmer et al. |
| 2009/0108158 A1 | 4/2009 | Kim et al. |
| 2009/0206221 A1 | 8/2009 | Timm et al. |
| 2009/0212669 A1 | 8/2009 | Robert-Reitman et al. |
| 2010/0006725 A1 | 1/2010 | Kim et al. |
| 2010/0091438 A1 | 4/2010 | Dittmer et al. |
| 2010/0149736 A1 | 6/2010 | Dittmer et al. |
| 2010/0155558 A1 | 6/2010 | Zhang et al. |
| 2011/0043978 A1 | 2/2011 | Bremmon et al. |
| 2011/0234926 A1 | 9/2011 | Smith |
| 2012/0032062 A1 * | 2/2012 | Newville ............ F16M 11/08 248/575 |

* cited by examiner

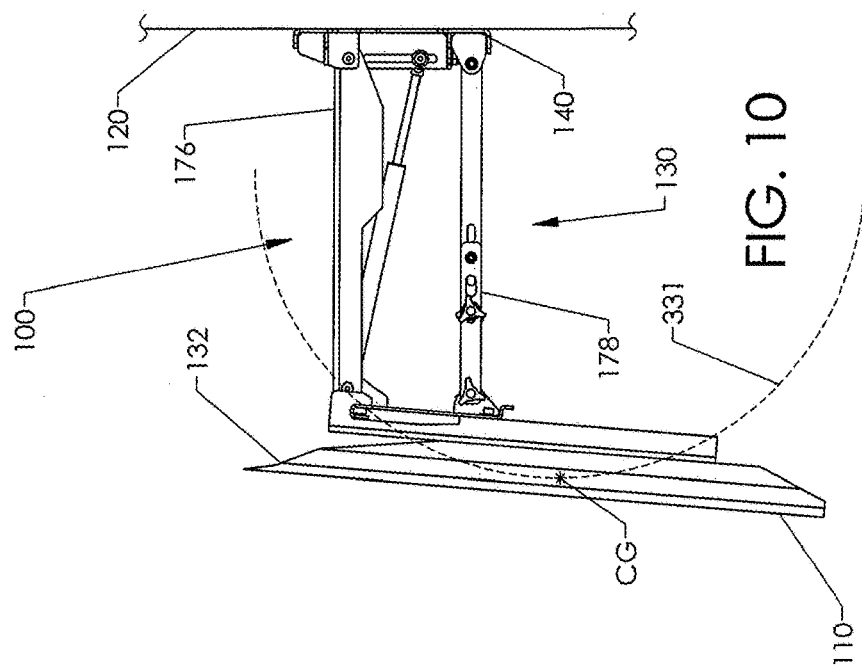
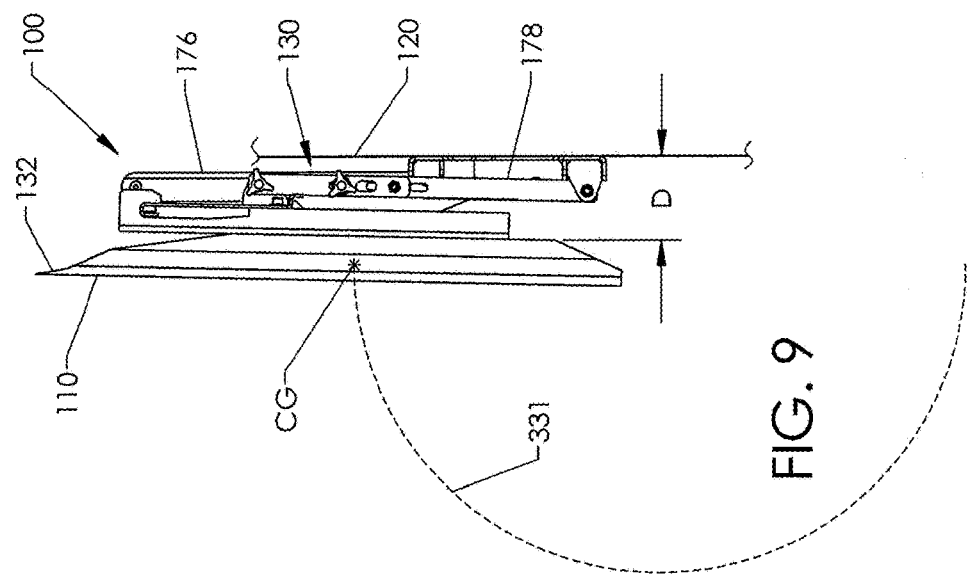

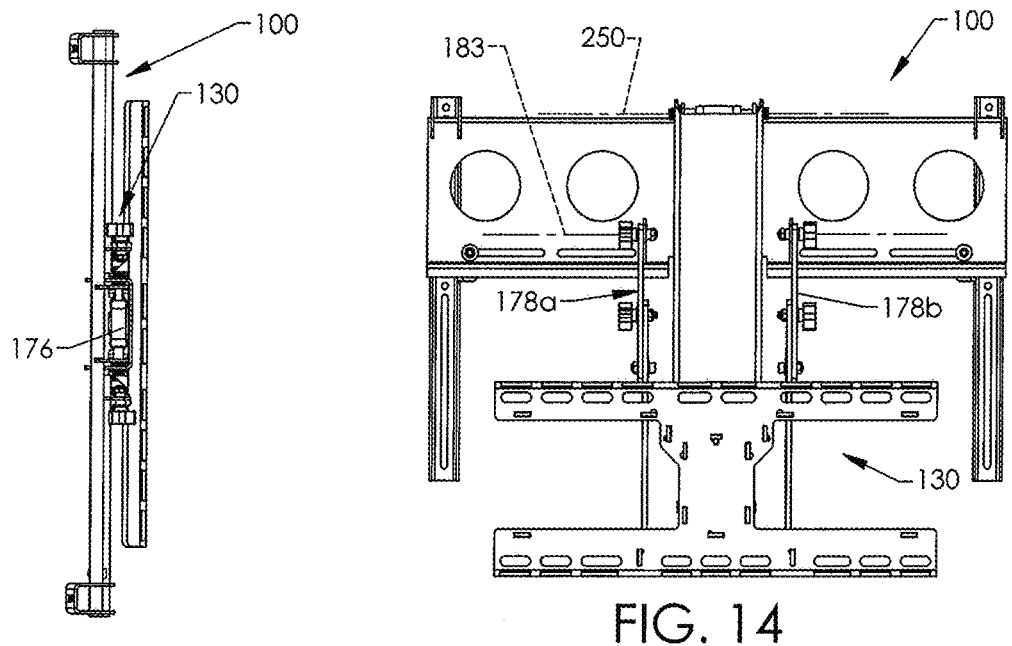
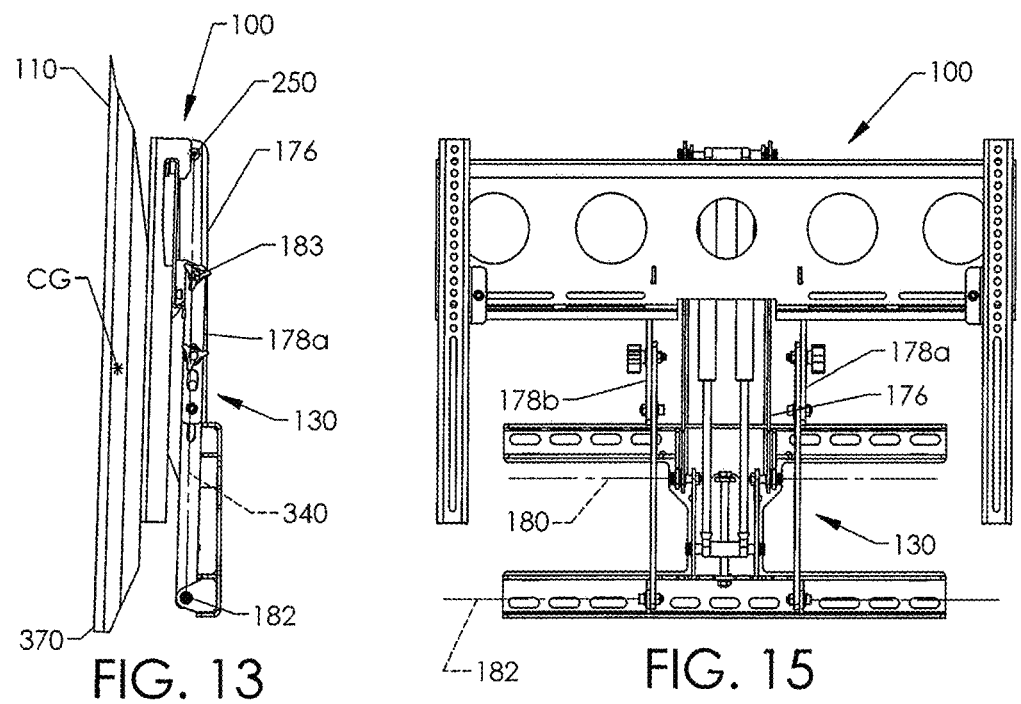

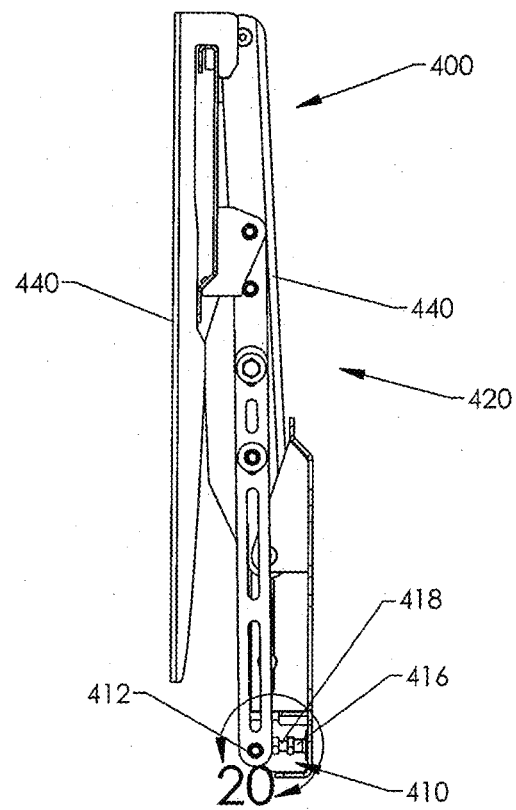
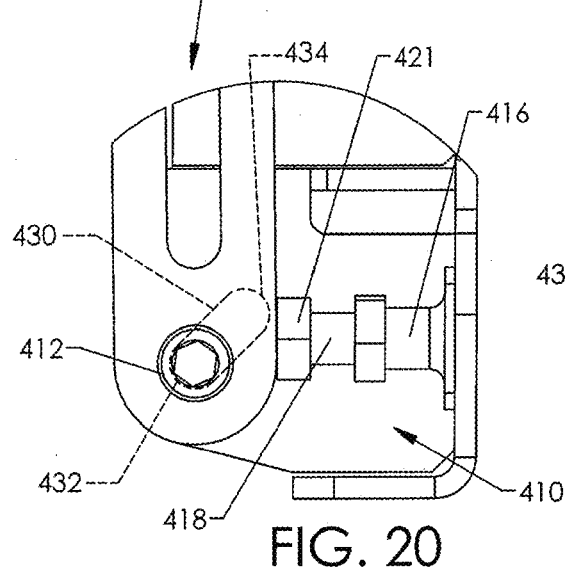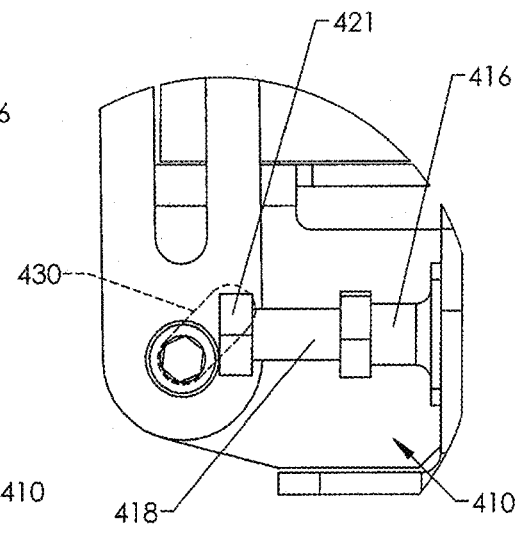
FIG. 19
FIG. 20
FIG. 20A

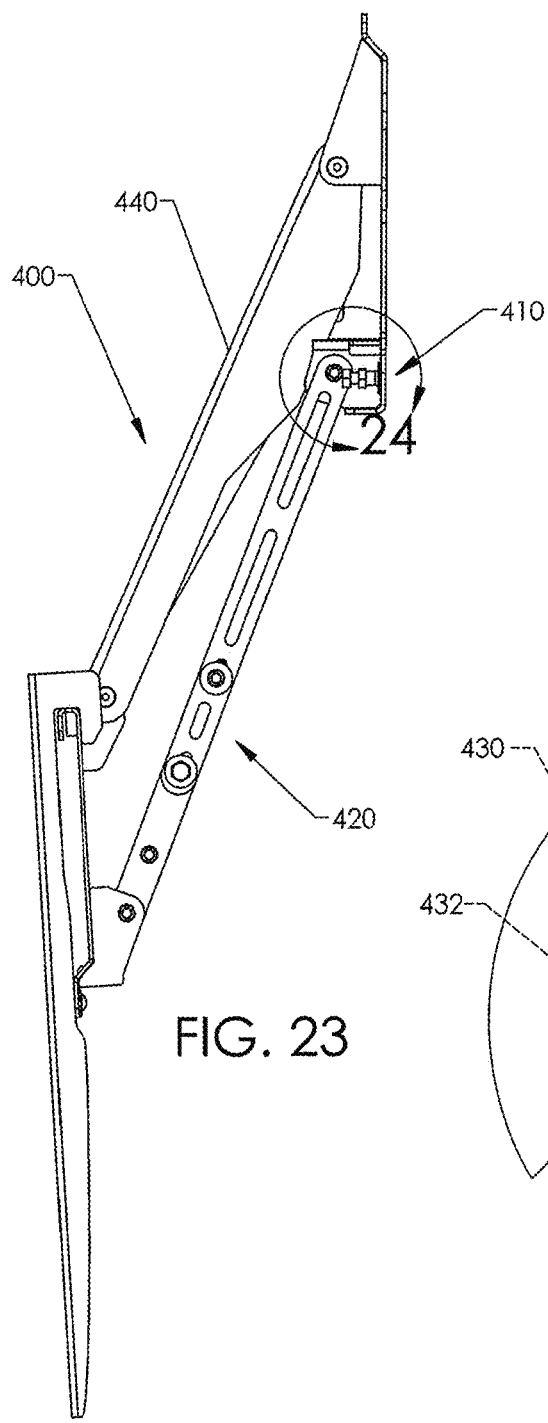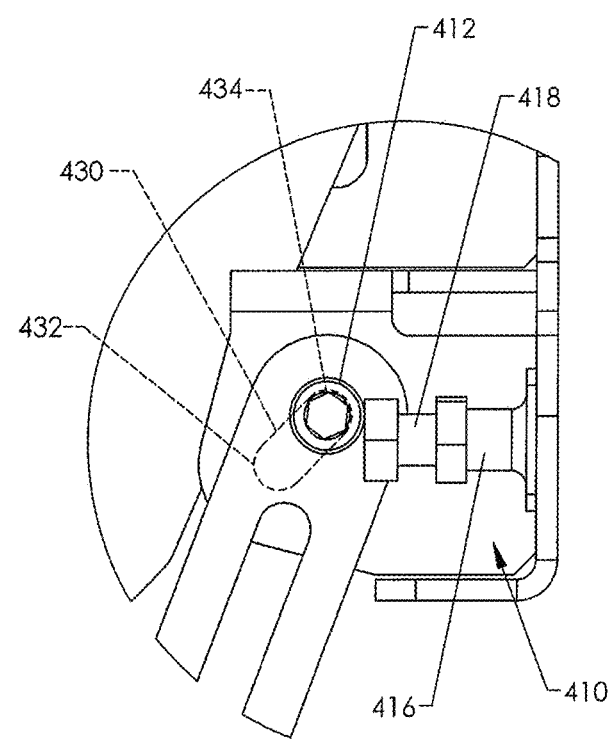
FIG. 23
FIG. 24

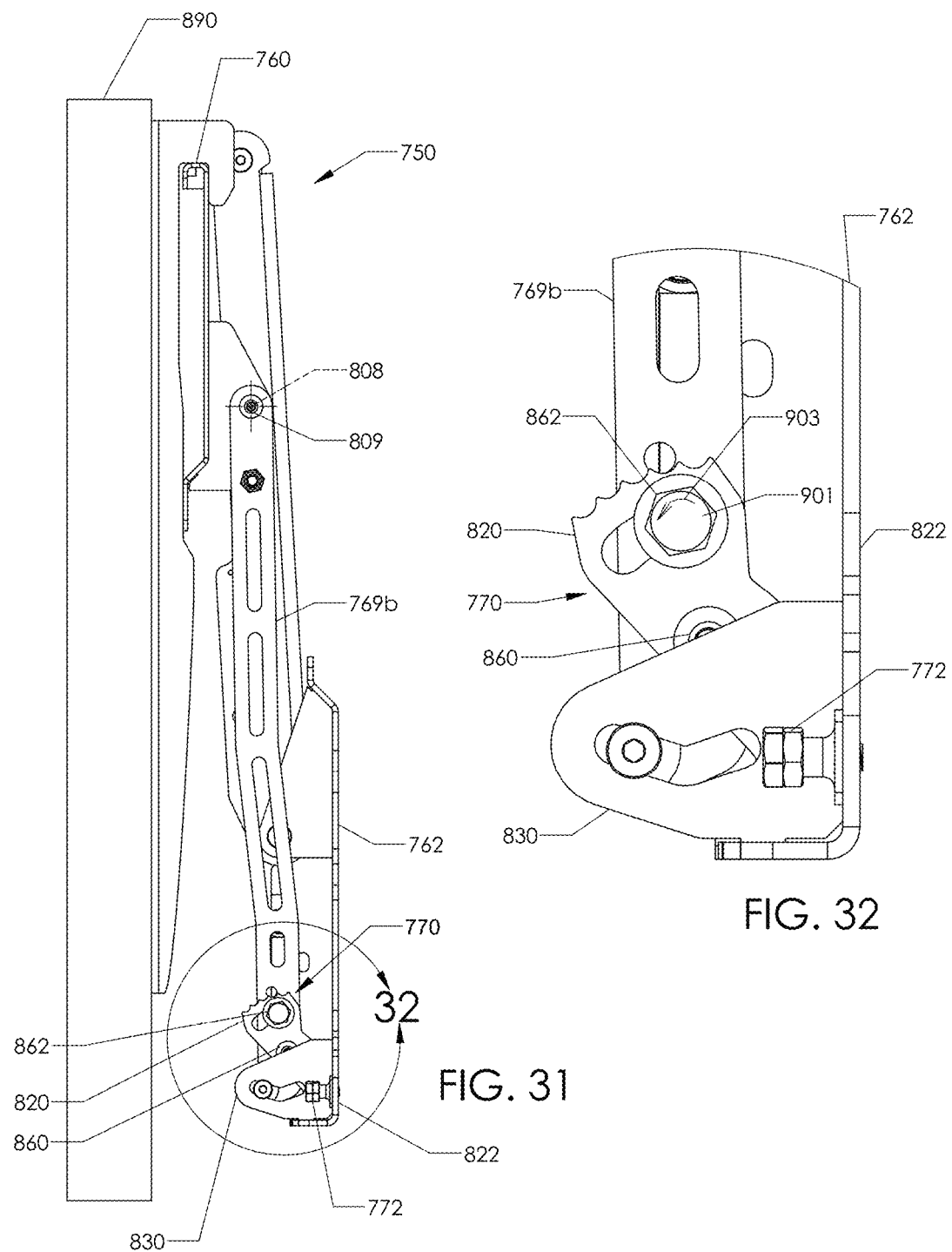

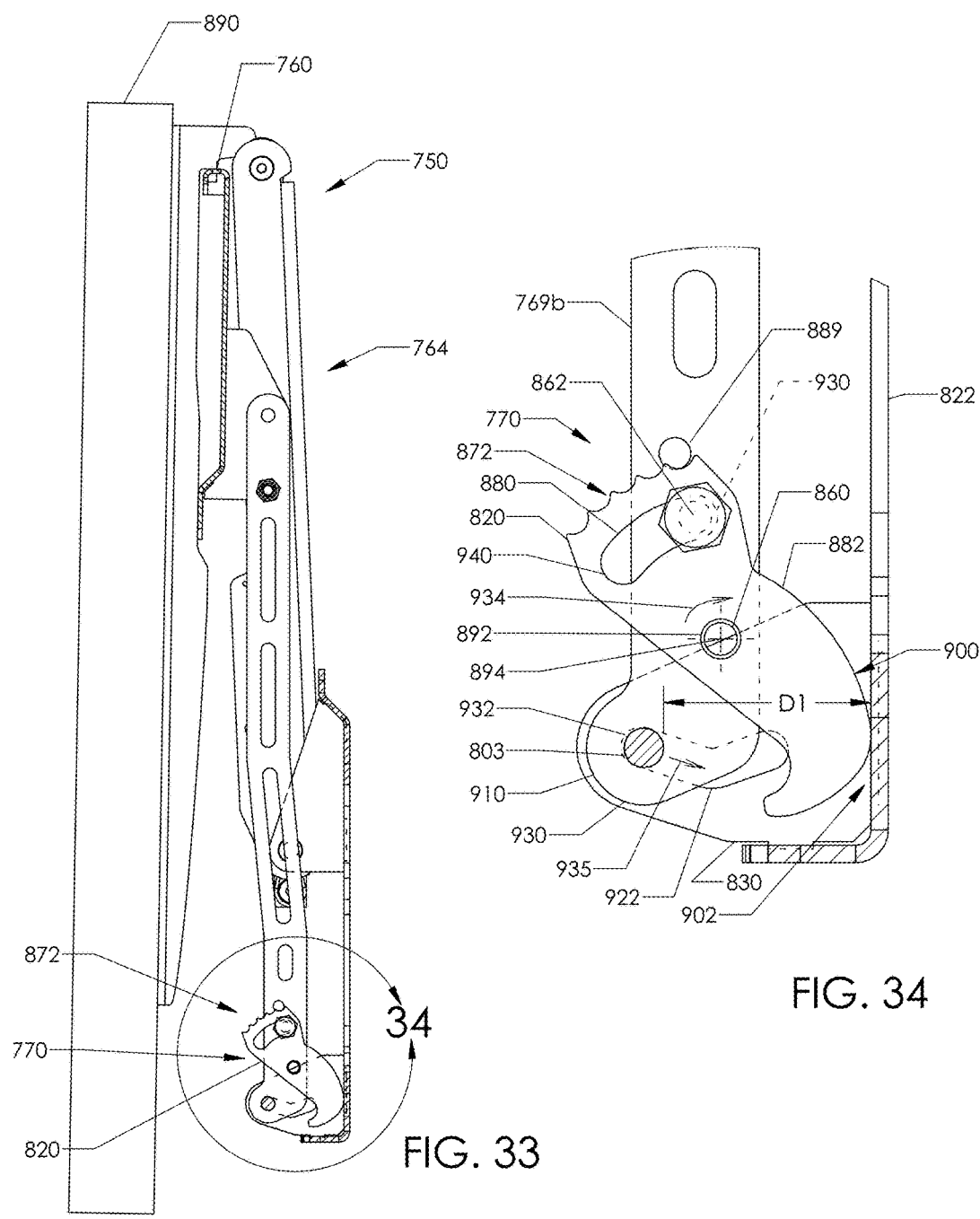

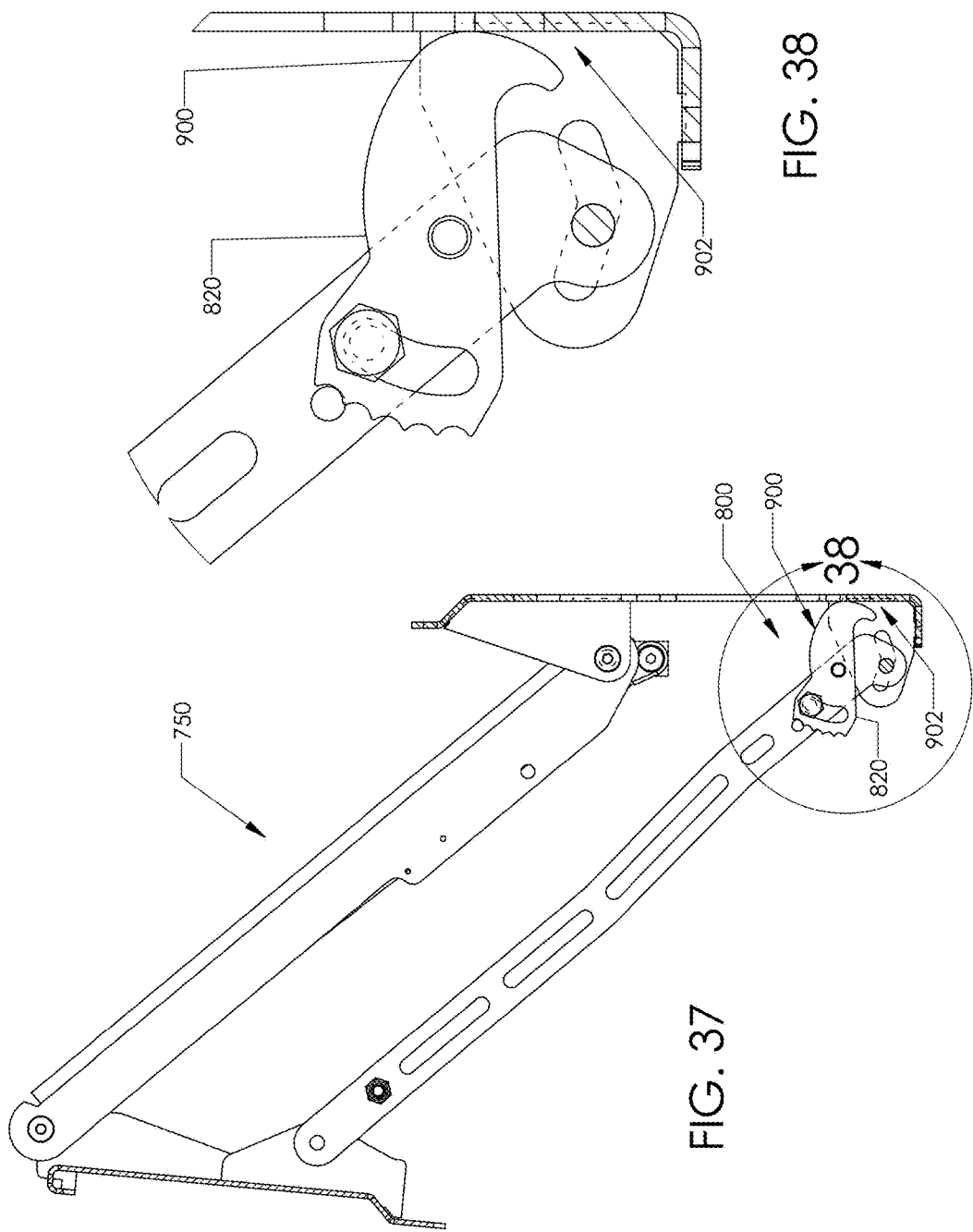

ADJUSTABLE MOUNTING SYSTEMS FOR TELEVISIONS

CROSS-REFERENCE TO RELATED APPLICATION

This application claims the benefit under 35 U.S.C. §119 (e) of U.S. Provisional Patent Application No. 61/913,195 filed Dec. 6, 2014. This provisional application is incorporated herein by reference in its entirety.

TECHNICAL FIELD

The present invention relates generally to mounting systems. More specifically, the invention relates to adjustable mounting systems for mounting objects to structures.

BACKGROUND

Televisions are often mounted directly to walls using wall mounts. Tilting wall mounts and full motion wall mounts are two types of mounts that allow movement of televisions. Tilting wall mounts often allow tilting only about a horizontal axis of rotation. Unfortunately, if tilting wall mounts are installed at relatively high locations, there may be limited viewing because ideal viewing often requires that the center of the screen be generally level with a viewer's eyes. Full motion wall mounts often allow the television to be moved horizontally away from walls, swiveling of the television, and/or tilting of the television. Because a viewer looks up at the television, it may result in uncomfortable viewing. If either a tilting wall mount or a full motion wall mount is installed at a high location (e.g., above a fireplace, a piano, furniture, etc.), the mounted television is often much higher than a sitting viewer's eyes and, thus, may not provide suitable comfortable viewing.

SUMMARY

At least some embodiments are directed to mounting apparatuses capable of holding and moving objects. Mounted objects can be held at relatively high locations to keep the objects out of the way when stowed. Mounted objects can be conveniently moved to different locations. In certain embodiments, the mounting apparatus can hold an electronic display in the form of a television and can include components for adjusting the position of the television to provide desired viewing of the television. The mounting apparatus can include, without limitation, one or more springs and/or pistons (e.g., gas pistons) that allow a user to smoothly raise and lower the television. Tilt adjustment mechanisms of the mounting apparatus can position the television at desired angles of tilt. As the television is raised and lowered, it can be gradually tilted for optimal viewing.

The mounting apparatus can be installed above, for example, furniture, a fireplace, a piano, or at other aesthetically pleasing location. A user can manually or automatically lower the television such that a viewer's eyes are at an appropriate position relative to the television. For example, the viewer's eyes can be generally level with the screen (e.g., level with the center of the screen). The television can be panned, tilted (e.g., rotated about a generally horizontal axis), and/or swiveled (e.g., rotated about a generally vertical axis) to accommodate different viewing positions. Pivots, swivels (e.g., swivel brackets), joints, or the like can be used to provide the desired motion. The television can range in weight from, for example, about, for example, 20 pounds to about 110 pounds.

A mounting system, in some embodiments, comprises a mounting apparatus including a bracket configured to hold an object, a fixed support bracket coupleable to a vertical support structure, and a linkage assembly. The linkage assembly has a low-profile stowed configuration in which the object is held close to the support structure. The linkage assembly is movable to reposition the object at different heights. One or more tilt setting mechanisms can be used to change the orientation of links to adjust the tilt of the object. If the object is an electronic display held at a relatively high position, tilt setting mechanisms can be used to angle the electronic display downwardly. For example, the electronic device can be angled such that a viewer's line of sight is substantially perpendicular to a screen of the electronic display. As the display is lowered, the screen can be gradually tilted to keep the screen generally perpendicular to the viewer's line of sight.

A biasing mechanism can facilitate movement of the object and, in some embodiments, can provide a variable counterbalance force that may different at the beginning, middle, and/or end of travel. In one embodiment, the biasing mechanism can include one or more springs, a counterbalance biasing mechanism (e.g., a piston, a gas spring, etc.), and/or other force generating devices. The biasing mechanism can provide an initial counterbalance force when a spring (or springs) is compressed and another counterbalance force when the counterbalance biasing mechanism extends/contracts. For example, the spring can be compressed as the mounting apparatus initially moves. As the spring is compressed, the counterbalance biasing mechanism can provide substantially no counterbalance force. After compressing the spring, the counterbalance biasing mechanism can provide a counterbalance force for a majority of the travel of the television. The counterbalance force provided by the counterbalance biasing mechanism can be greater than the force provided by the biasing mechanism due to compression of the spring. The television can be moved by applying a gradually increasing force for smooth movement.

In some embodiments, a mounting system includes a multi-bar linkage configured to store an object at a raised, low profile position close to the wall (e.g., within 5 inches of the wall). The mounted object can be moved away from the raised position along a path (e.g., an arcuate path, a partially circular path, a curved path, a partially elliptical path, or the like). The multi-bar linkage can include a main linkage that connects a support bracket to a display bracket. The mounting system can include a tilt adjustment mechanism that adjusts the position of at least one adjustable link relative to a main linkage and/or support bracket to adjust the tilt of the display bracket.

The mounting system can include a counterbalance assembly that can be adjusted to provide smooth controlled movement of the mounting system. The counterbalance assembly can include, without limitation, a force adjustment mechanism operable to increase and decrease a counterbalance force. In one embodiment, the force adjustment mechanism can provide a relatively low counterbalance force to allow initial movement of the television. The counterbalance force can be increased (e.g., gradually increased) as the television is further moved toward a desired position. In some embodiments, the counterbalance assembly can provide a relatively low counterbalance force to allow initial upward or downward movement of the television when the television is in the lowered or raised position, respectively.

In further embodiments, a television mounting apparatus has a raised configuration and a lowered configuration and comprises a display bracket, a fixed support bracket, and a linkage assembly. The fixed support bracket is configured to be coupled to a vertical support structure. The linkage assembly is rotatably coupled to the display bracket and rotatably coupled to the fixed support bracket such that a television carried by the display bracket is movable from a raised position to a lowered position by moving the television mounting apparatus from the raised configuration to the lowered configuration. A tilt adjustment mechanism can be used to set the configuration of the television mounting apparatus. The tilt adjustment mechanism, in some embodiments, can be used to increase or decrease tilt of one or more links of the linkage assembly relative to the fixed support bracket to adjust orientation (e.g., tilt) of the television.

In yet further embodiments, a television mounting apparatus for holding a television includes a display bracket, a fixed support bracket configured to couple to a wall, and an assembly rotatably coupled to the fixed support bracket and carrying the display bracket. The assembly is movable relative to the fixed support bracket to move the display bracket between different positions (e.g., a raised position, an intermediate position, a lowered position, etc.). At least one tilt adjustment mechanism can be operable to adjust the orientation of a display held by the display any position.

Some embodiments are a television mounting apparatus that includes a display bracket, a fixed support bracket, and an assembly rotatably coupled to the display bracket and movable relative to the fixed support bracket to move (e.g., raise, lower, pan, etc.) the display bracket. In one embodiment, the television mounting apparatus can include a counterbalance assembly with a counterbalance biasing mechanism configured to provide a biasing force and a force adjustment mechanism operable to increase and decrease the biasing force provided by the counterbalance biasing mechanism.

BRIEF DESCRIPTION OF THE DRAWINGS

Non-limiting and non-exhausting embodiments are discussed with reference to the following drawings. The same reference numerals refer to like parts or acts throughout the various views, unless specified otherwise.

FIG. 9 is a side elevational view of the mounting system in a stowed configuration.

FIG. 10 is a side elevational view of the mounting system in a deployed expanded configuration.

FIG. 12 is a top plan view of the stowed mounting system.

FIG. 13 is a side elevational view of the stowed mounting system of FIG. 12 holding a television.

FIG. 14 is a back elevational view of the stowed mounting system of FIG. 12.

FIG. 15 is a front elevational view of the stowed mounting system of FIG. 12.

FIG. 19 is a side elevational view of the mounting system of FIG. 18 in a stowed configuration.

FIG. 20 is a detailed view of a positioner of FIG. 19.

FIG. 20A is a detailed view of the positioner in an extended configuration.

FIG. 23 is a side elevational view of the mounting system of FIG. 18 holding a television at a lowered position.

FIG. 24 is a detailed view of the positioner.

FIG. 31 is a side view of the mounting system of FIG. 29.

FIG. 32 is a detailed view of a tilt adjustment mechanism of FIG. 31.

FIG. 33 is a cross-sectional view of the mounting system taken along a line 33-33 of FIG. 30.

FIG. 34 is a detailed view of the tilt adjustment mechanism of FIG. 33.

FIG. 37 is a side elevational view of the mounting system in a partially raised configuration.

FIG. 38 is a detailed view of the tilt adjustment mechanism of FIG. 37.

DETAILED DESCRIPTION

Figure 1:
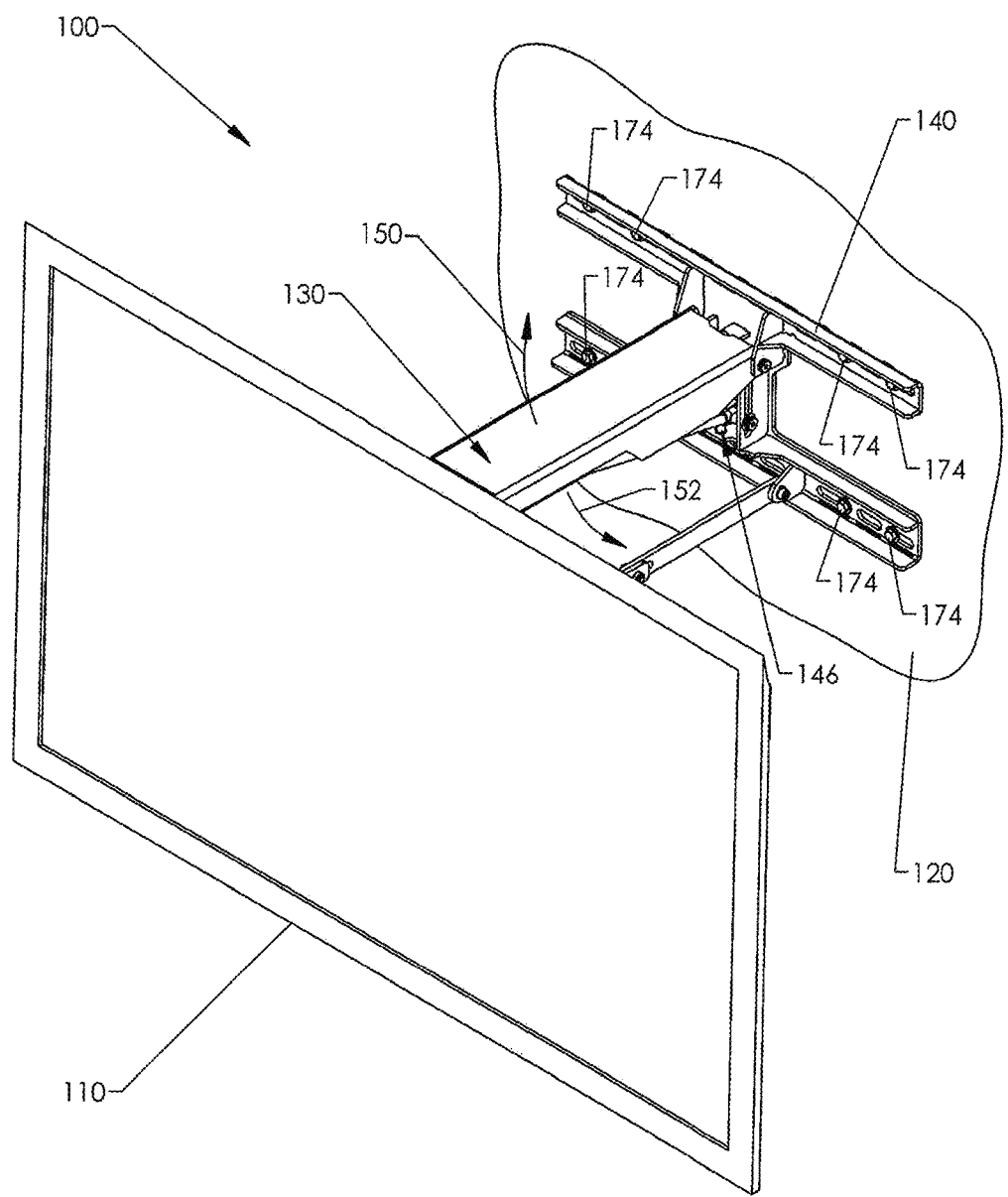
FIG. 1 is an isometric view of a television held by a mounting system connected to a wall.

FIG. 1 shows a mounting system in the form of a television mounting apparatus or wall mount 100 ("wall mount 100") carrying an electronic display in the form of a flat screen television 110. A collapsible linkage assembly 130 is connected to a support bracket 140 that is mounted to a support structure in the form of a wall 120. The linkage assembly 130 can swing upwardly (indicated by arrow 150)

or downwardly (indicated by arrow 152). An adjustment mechanism 146 is operable to adjust a biasing force provided by a biasing mechanism to allow for controlled movement of the television 110. Once the television 110 is at a desired position, the biasing mechanism keeps the television 110 stationary.

Figure 2:
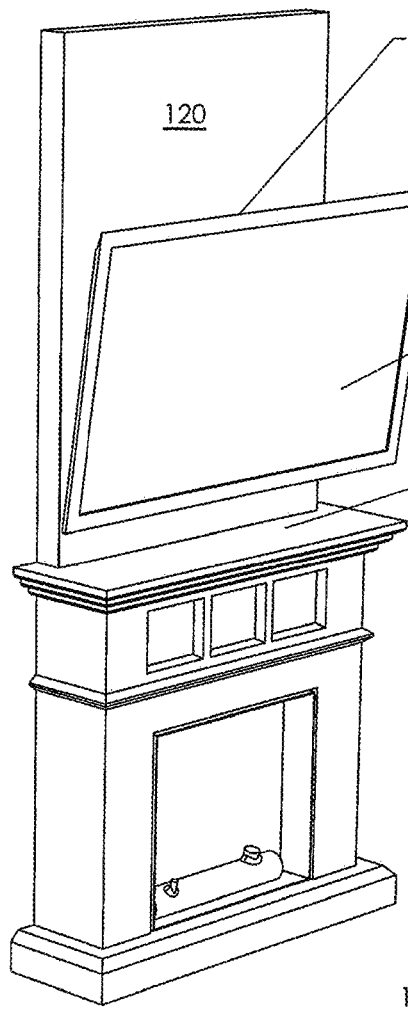
FIG. 2 shows a television installed above a fireplace.

FIG. 2 shows the television 110 in a raised, stowed position and very close to the wall 120. The wall mount 100 is hidden from view of someone in front of the television 110 for an aesthetically pleasing appearance. Advantageously, it may be difficult for small children to reach up and pull down on the television 110. The illustrated stowed television 110 is positioned above a fireplace to avoid occupying usable space and to reduce the likelihood of unwanted inadvertent contact by people moving about the room. If the fireplace includes a hearth, it may be difficult for small children, or other individuals, to inadvertently contact the television 110.

Figure 3:
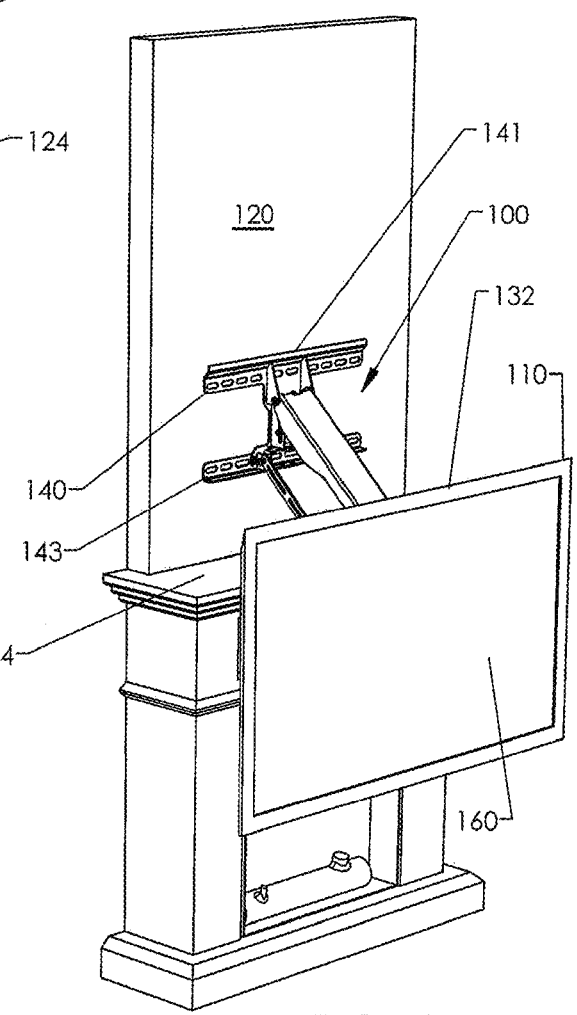
FIG. 3 shows the television in a lowered position in front of the fireplace.

The television 110 can swing downwardly and, if desired, can be positioned in front of the fireplace, as shown in FIG. 3. The lowered television 110 can be positioned very close to the front of the fireplace. A viewer's eyes can be generally level with a center of a screen 160. The lowered television 110 is especially well suited for viewing when someone is positioned near the television 110, for example, to play a game system (e.g., Xbox 360, PlayStation®, PlayStation®2, PlayStation®3, Nintendo game system, or the like) or to provide convenient viewing while sitting, for example, on furniture or on the floor. After viewing, the television 110 can be returned to the stowed position.

Referring again to FIG. 2, a top 132 of the stowed television 110 can be angled forwardly such that the screen 160 is substantially perpendicular to a sitting viewer's line of sight. Alternatively, the television 110 can be flat against the wall 120 (e.g., parallel to the wall 120) to minimize or limit unwanted reflections from the screen 160 that may be directed to someone sitting on furniture in front of the television 110, especially when the television 110 is turned OFF. The wall mount 100 can automatically tilt the television 110 as the television 110 moves vertically. As the television 110 is lowered, it can gradually tilt to keep the screen 160 substantially perpendicular relative to the viewer's line of sight. Once the television 110 is at a desired position, the television 110 can be further tilted using an automatic or manual tilt mechanism, if needed or desired.

In some manually deployable embodiments, a user can conveniently grasp and pull the television 110 away from the wall 120. The television 110 will move forward a significant distance before it starts to move down a significant distance such that the television 110 can be brought down and in front of a protruding object below the support bracket 140, illustrated in FIGS. 2 and 3 as a fireplace mantel 124. The top 132 of the television 110 can be lower than a top 141 of the support bracket 140 and, in some embodiments, is positioned lower than a bottom 143 of the support bracket 140. One or more adjustable fixed stops can be used to prevent contact with the mantel 124 or to achieve repeatable positioning, or both.

The wall mount 100 can be coupled to a wide range of different types of support structures, such as vertical support structures in the form of walls of a dwelling (e.g., a house, an apartment, etc.), an office, a lobby, a bar (e.g., a sports bars), or the like and can be mounted to vertical walls or non-vertical walls, including, without limitation, angled walls, non-planar walls, or other structures sturdy enough to handle the load of the wall mount 100 and any attached object(s).

The television 110 can be, without limitation, a liquid crystal display (LCD) television, a plasma television, a light emitting diode (LED) television, or other type of flat screen television, as well as other types of wall mountable televisions. The weights of such televisions are often in a range of about 20 lbs to about 110 lbs and often have a maximum thickness less than about 5 inches. Advantageously, large screen televisions have a screen with a length (measured diagonally) equal to or greater than about 30 inches and can hide the entire wall mount 100, as shown in FIG. 2. The wall mount 100 can also hold small or medium screen televisions. Other types of electronic displays (e.g., monitors) or objects can be carried by the wall mount 100. Exemplary mountable objects include, but are not limited to, screens suitable for use with front projectors, boards (e.g., a chalk board, a dry erase board, etc.), containers (e.g., a basket, a bin, or the like), or the like.

Figure 4:
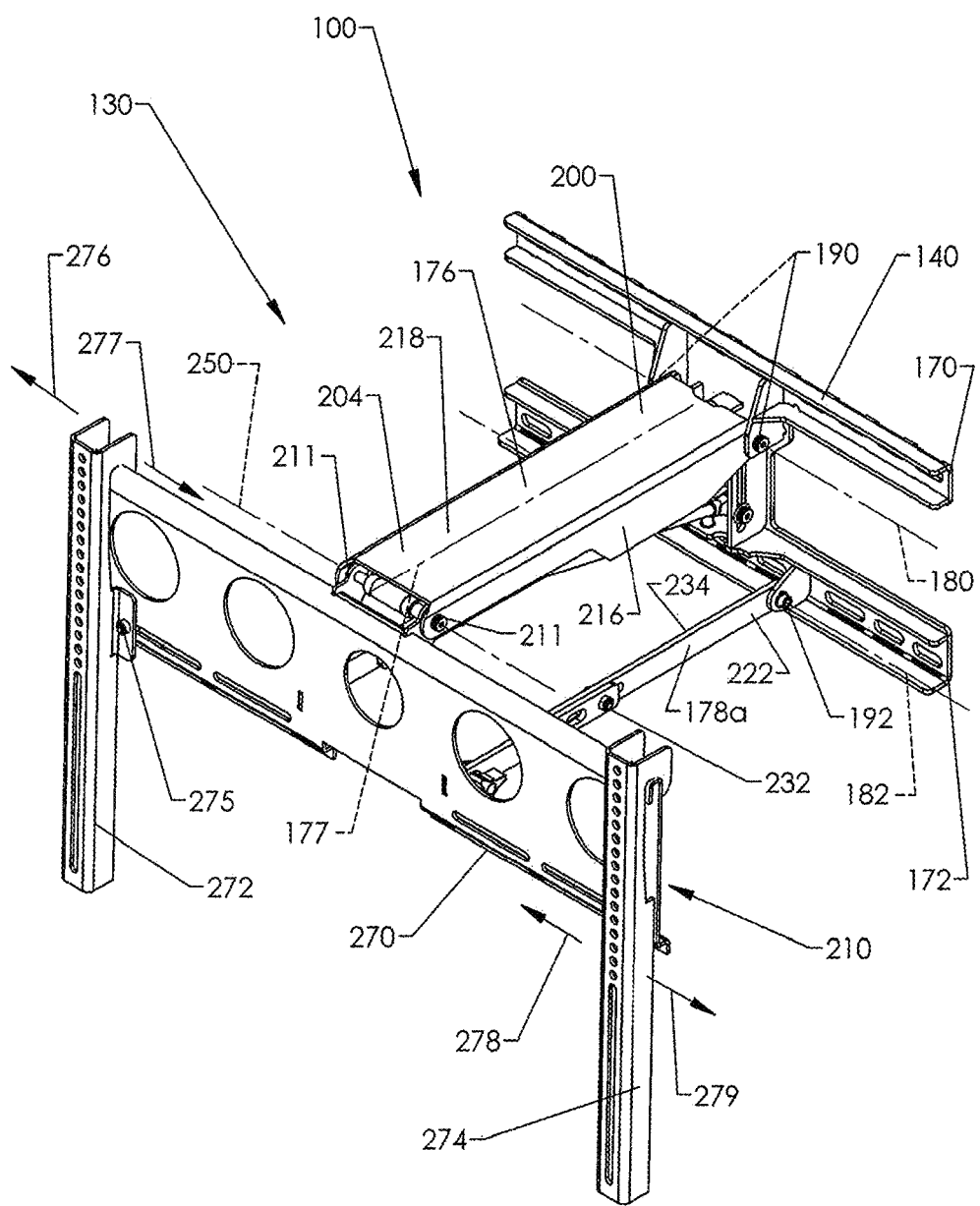
FIG. 4 is an isometric view of a mounting system, in accordance with one embodiment.
Figure 5:
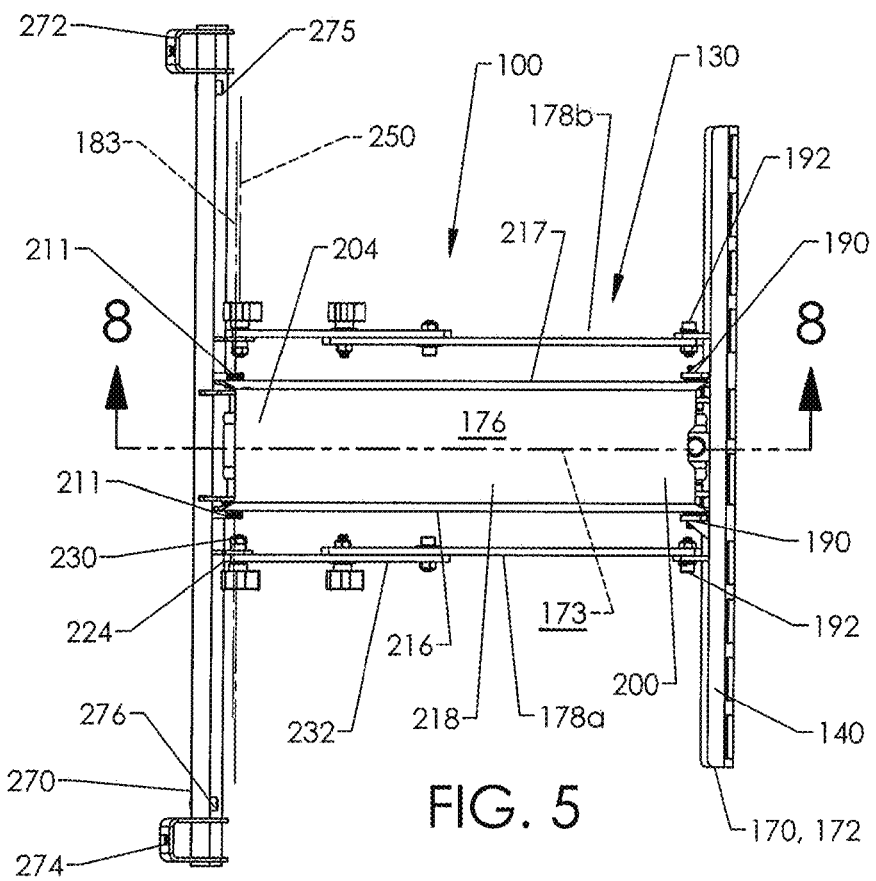
FIG. 5 is a top plan view of the mounting system of FIG. 4.
Figure 6:
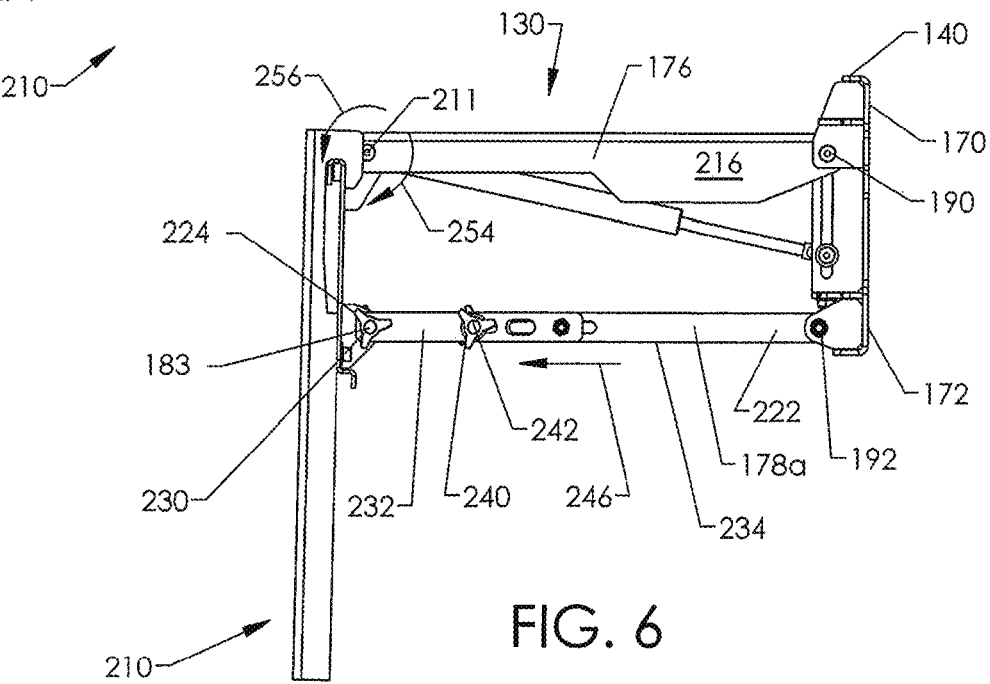
FIG. 6 is a side elevational view of the mounting system of FIG. 4.

FIGS. 4-6 show the support bracket 140, a display bracket 210, and the linkage assembly 130 that cooperate to define a four bar linkage. Support bracket 140 can include a pair of spaced apart elongate members 170, 172, each including a plurality of apertures for receiving fasteners, such as fasteners 174 in FIG. 1. As used herein, "bracket" is a broad term that includes one-piece or multi-piece structural supports configured to be coupled (e.g., fixedly coupled) to a support surface or structure. Brackets can be made, in whole or in part, of metal (e.g., steel, aluminum, etc.), composites, plastic, polymers, combinations thereof, or the like. In one-piece embodiments, a bracket can be formed using a stamping process, a machining process, or the like. In multi-piece embodiments, separate pieces can facilitate packaging for shipping. The pieces can be assembled after unpacking. Other types of one-piece or multi-piece brackets can be used, if needed or desired.

Referring to FIGS. 4 and 5, wall mount 100 is symmetrical with respect to a center plane 173 and, thus, may be described with reference to one side. A main bearing member in the form of an upper link 176 is rotatable about an upper axis of rotation 180 defined by support pivots 190. A pair of lower links 178a, 178b (collectively "178") are rotatable about a lower axis of rotation 182 defined by support pivots 192. The axes of rotation 180, 182 can lie in an imaginary plane which is substantially parallel to the wall 120.

The upper link 176 can include a support end 200 and an opposing bracket end 204. Pivots 190 couple the support end 200 to the bracket 140. Pivots 211 couple the bracket end 204 to the display bracket 210. The upper link 176 has a fixed length and a generally U-shaped transverse cross-section taken generally perpendicular to its longitudinal axis 177. Sidewalls 216, 217 are connected to an upper plate 218.

The lower links 178 are generally similar to one another and, accordingly, the description of one lower link applies equally to the other, unless indicated otherwise. The lower link 178a includes a support bracket end 222 rotatably coupled to the support bracket 140 by the pivot 192. FIG. 6 shows a pivot 230 coupling the display bracket end 224 to the display bracket 210 and defining an axis of rotation 183.

With reference to FIG. 6, the link 178a includes rigid slotted members 232, 234 and pins extending through the members 232, 234. The slotted members 232, 234 are slidable relative to one another. An adjustment mechanism in the form of a tilt adjustment mechanism 240 is slidably retained in a slot of the member 232 and a hole in the member 234. A handle 242 can be rotated to lock and unlock the link 178a. To lengthen the link 178a, the handle 242 is rotated counter-clockwise and the member 232 is slid away from the support bracket 140, as indicated by an arrow 246. The length of the link 178a can be increased to rotate the display bracket 210 clockwise (indicated by an arrow 254) about a tilt axis of rotation 250 (FIG. 5) defined by the pivots 211. The display bracket 210 can be rotated counter-clockwise about the tilt axis of rotation 250 (indicated by an arrow 256) by sliding the member 232 in the opposite direction. After the television 110 is in the desired orientation, the handle 242 is rotated clockwise to securely hold the member 232 between the member 234 and the handle 242. The dimensions (e.g., the longitudinal lengths) of the slots can be increased or decreased to increase or decrease the amount of tilt. Other locking mechanisms can include, without limitation, one or more rollers, slides (e.g., linear slides), locks, clamps, pins, ratchet mechanisms, or combinations thereof that cooperate to prevent, limit, or inhibit relative movement between components.

Referring to FIGS. 4 and 5, display bracket 210 includes a rail 270 and elongate arms 272, 274 hanging on the rail 270. The arms 272, 274 can be slid along the rail 270, as indicated by arrows 276, 277, 278, 279, to accommodate different sized objects. Fasteners 275, 276 fixedly couple the elongate arms 272, 274 to the rail 270. Fasteners can pass through apertures in the elongate arms 272, 274 to hold the television 110. Other types of display brackets can also be used. The configuration, size, and design of the display bracket can be selected based on the configuration, size, and design of the television or other object to be mounted.

Figure 7:
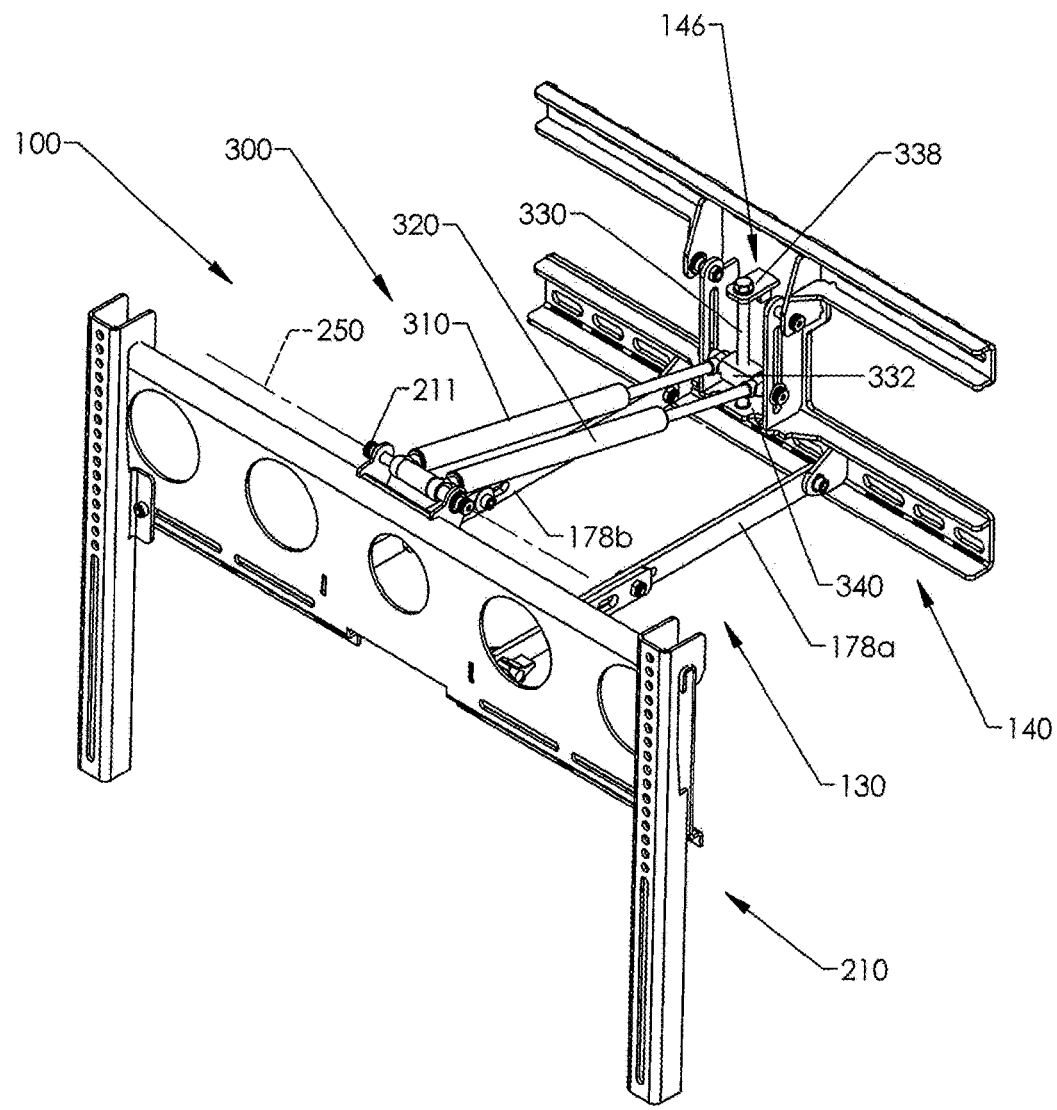
FIG. 7 is an isometric view of the mounting system with an upper arm shown removed.

FIG. 7 shows the wall mount 100 with the upper link removed. A biasing mechanism in the form of a counterbalance mechanism 300 cooperates with the linkage assembly 130 to allow a user to effortlessly move the television to different positions but prevents or inhibits movement of the television when the user does not apply a force. The television can be moved using a force that is less than a threshold force. The threshold force can be about 2 lbf., 3 lbf., 5 lbf., 10 lbf., or 20 lbf., as well as any other suitable threshold force. In some embodiments, counterbalance mechanism 300 counterbalances the weight of the television and the weight of the suspended components in order to allow movement with a desired amount of resistance (e.g., a minimal amount of resistance, a threshold amount of resistance, etc.). The counterbalance mechanism 300 can include force balancing devices, illustrated as pistons 310, 320 rotatably coupled to the display bracket 210 and support bracket 140. The pistons 310, 320 can be gas pistons, pneumatic pistons, or other type of biasing devices capable of providing a desired force, including, without limitation, a substantially constant force, variable force, or the like.

Figure 8:
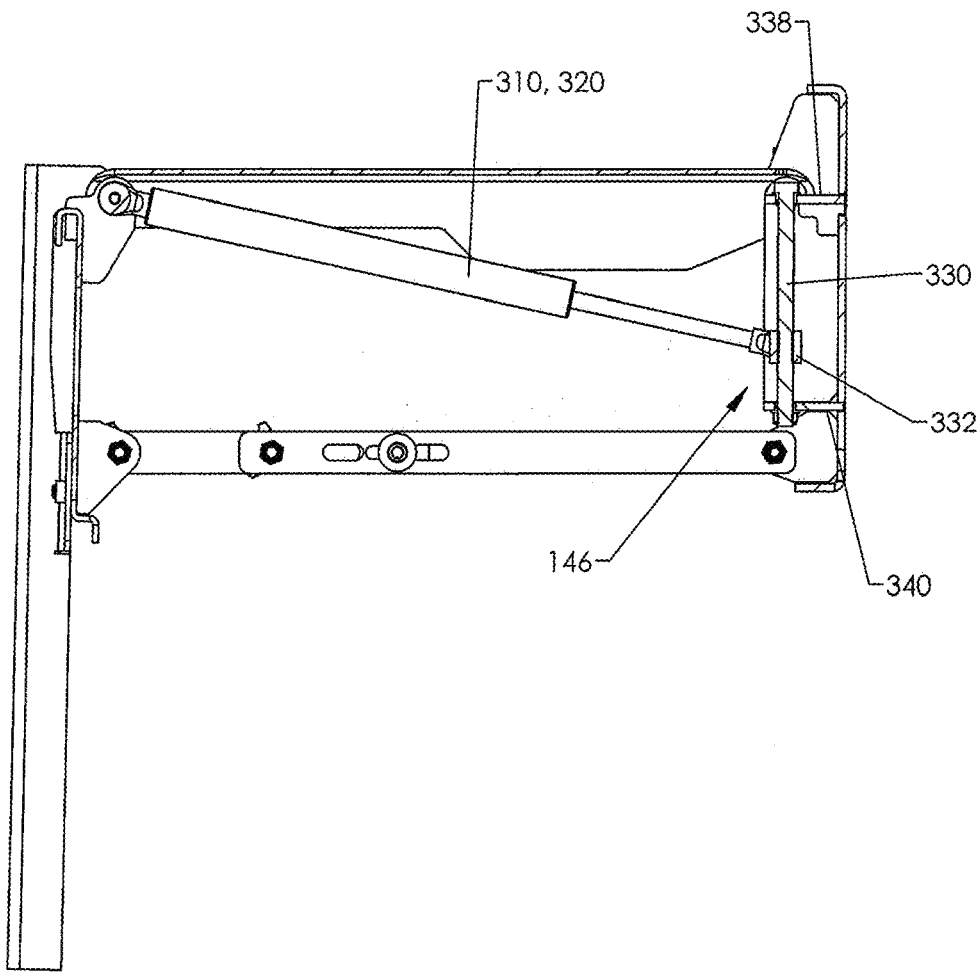
FIG. 8 is a cross-sectional view of the mounting system taken along a line 8-8 of FIG. 5.

Referring to FIGS. 7 and 8, force adjustment mechanism 146 includes a threaded rod 330 held by holders 338, 340 of the support bracket 140. The rod 330 can be rotated to move a carriage or block 332 upwardly or downwardly. The carriage 332 is rotatably coupled to the counterbalance mechanism 300 and can be in a first position such that the counterbalance mechanism 300 is in a first setting or configuration to provide a first balancing force. The carriage 332 can be moved to a second position such that the counterbalance mechanism 300 is in a second setting or configuration to provide a second balancing force that is substantially different from the first balancing force. For example, the first balancing force can counterbalance a television that weighs about 100 pounds wherein the second balance force can counterbalance a television that weighs about 40 pounds. Other types of force adjustment mechanisms can include, without limitation, one or more motors (e.g., stepper motors), linear slides, threaded rods, pulleys, combinations thereof, or the like.

Figure 11:
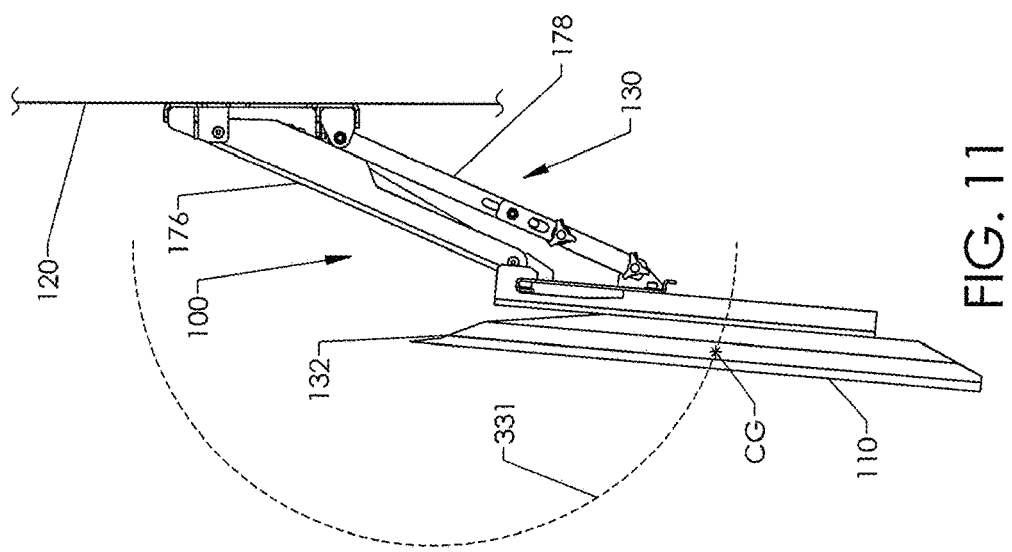
FIG. 11 is a side elevational view of a television in a lowered position.

FIGS. 9, 10, and 11 show the television 110 in a stowed position, an intermediate position, and a lowered position, respectively. The linkage assembly 130 of FIG. 9 is in a substantially upright position. The lower links 178 move away from and remain substantially parallel to the upper link 176 as the television 110 moves away from the wall 120. FIG. 10 shows the linkage assembly 130 in an expanded configuration and extending substantially horizontally away from the support bracket 140. FIG. 11 shows the linkage assembly 130 in a lowered configuration and extending downwardly away from the support bracket 140. Details of the illustrated positions are discussed below.

Referring to FIG. 9, wall mount 100 has a relatively low-profile configuration to minimize a distance D between the television 110 and the support surface 120. In some embodiments, distance D is less than about 8 inches, 6 inches, 5 inches, 4 inches, or 2 inches. Other distances D are also possible. The upper link 176 and lower links 178 nest together to provide a space saving and aesthetically pleasing low profile configuration.

As the television 110 is moved downwardly along a path 331, it can tilt backwardly (e.g., rotate clockwise as viewed from the side) such that the screen is angled upwardly, as illustrated in FIGS. 10 and 11. The wall mount 100 can also be modified to be a five bar linkage to provide such motion. The television 110 of FIG. 11 is especially well positioned for viewers with their heads positioned slightly above the center of the screen. Alternatively, television 110 can be moved along the path 331 without appreciably changing the tilt setting. For example, the center gravity (CG) of the television 110 can travel along the generally arcuate path 331 without appreciable rotation or angular displacement of the television 110. Thus, television 110 can be translated or rotated, or both.

The upper link 176 and lower links 178 can rotate about respective axes of rotation 182, 180 from about 130 degrees to about 180 degrees. In some embodiments, the upper link 176 and lower links 178 rotate about the respective axes of rotation 182, 180 about 160 degrees. If the television 110 is mounted above a fireplace, upper link 176 and lower links 178 can rotate about respective axes of rotation 182, 180 an angle in a range of about 90 degrees to about 160 degrees. Other angles are also possible, if needed or desired.

FIGS. 12-15 show the linkage assembly 130 in a substantially upright position. The lower links 178 are alongside and laterally adjacent to the upper linkage 176. FIG. 13 shows at least a portion of the lower link 178a positioned in front of the upper link 176 as viewed along the lower axis of rotation 182. As shown in FIGS. 14 and 15, upper link 176 is positioned between the lower links 178a, 178b. Such a nested arrangement provides a relatively low profile to position the mounted object very close to a wall.

Figure 16:
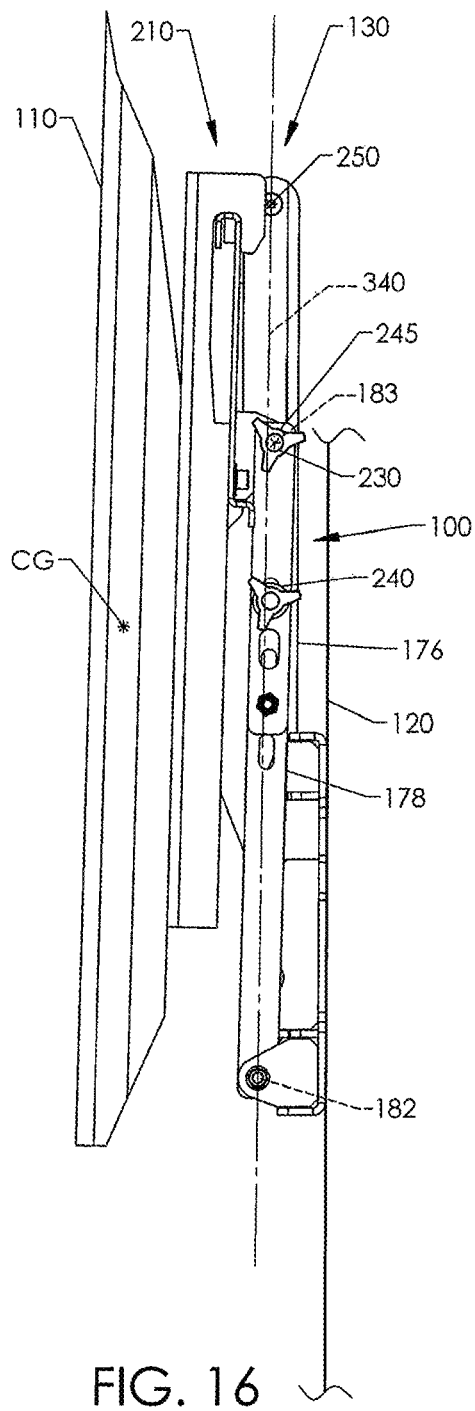
FIG. 16 is a side elevational view of the stowed mounting system holding a television generally parallel relative to a wall.
Figure 17:
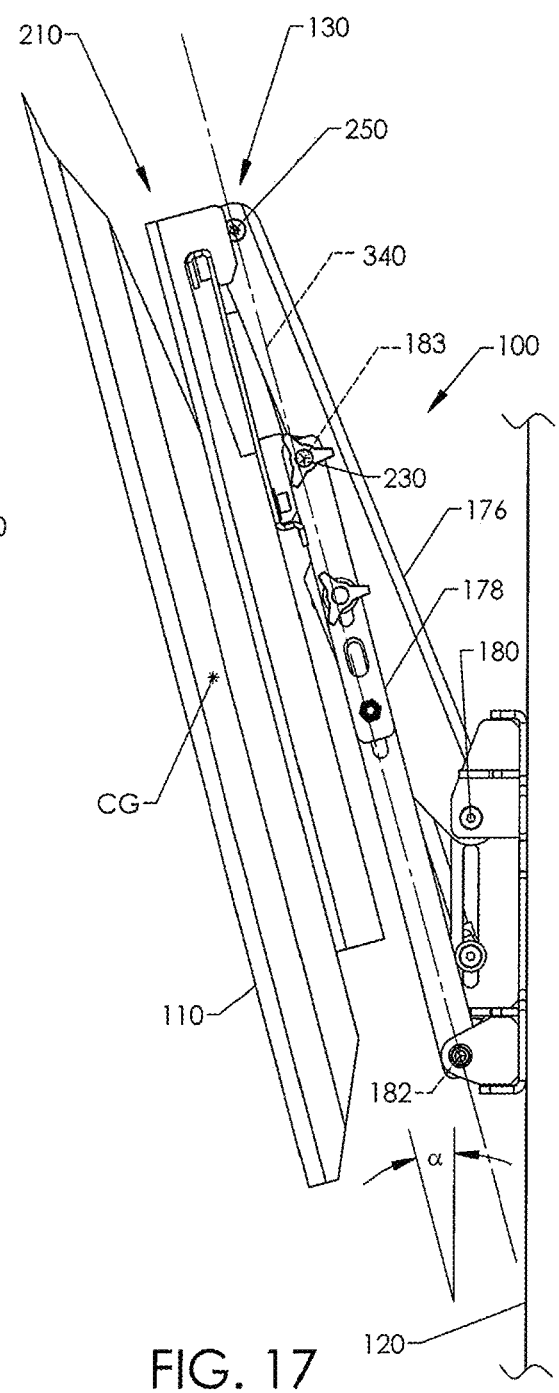
FIG. 17 is a side elevational view of the stowed mounting system holding a television tilted downwardly.

FIGS. 13, 16, and 17 show the linkage assembly 130 in an over-center configuration. The CG of the television 110 and the axis of rotation 183 are on opposite sides of an imaginary plane 340. The lower inner axis of rotation 182 and tilt axis of rotation 250 lie in the imaginary plane 340. Gravitational force acting on the television 110 causes the pivots 230 to be pushed towards the wall 120 to keep the linkage assembly 130 in the stowed configuration. A locking mechanism 245, illustrated as a locking knob mechanism, can be tightened to ensure that the linkage assembly 130 remains locked. The locking mechanism 245 can comprise a handle with a threaded member. The handle can be rotated to press the link 178 against a portion of the bracket 210 to prevent or inhibit relative movement between the link 178 and the bracket 210. In other embodiments, the locking mechanism 245 can be in the form of a fine tune tilt adjustment mechanism and can include one or more gears, ratchet mechanisms, or other features that allow controlled tilting.

When the linkage assembly 130 is in an unlocked state, the bottom of the television 110 can be pulled away from the support bracket 140 to move the pivots 230 away from the wall 120 and across the imaginary plane 340. Once the pivots 230 move across the imaginary plane 340, the linkage assembly 130 is released, thus allowing lowering of the television 110.

The lengths of the links 178 of FIG. 16 may be decreased to rotate the television 110 counterclockwise about the axis of rotation 250 so as to move the bottom of the television 110 rearwardly. The links 178 of FIG. 17 can be lengthened to tilt the top of the television 110 rearwardly. In various embodiments, television 110 can be tilted an angle α (FIG. 17) of about ±5 degrees to about ±55 degrees. In certain embodiments, a tilt angle α of about 15 degrees can be achieved.

Figure 18:
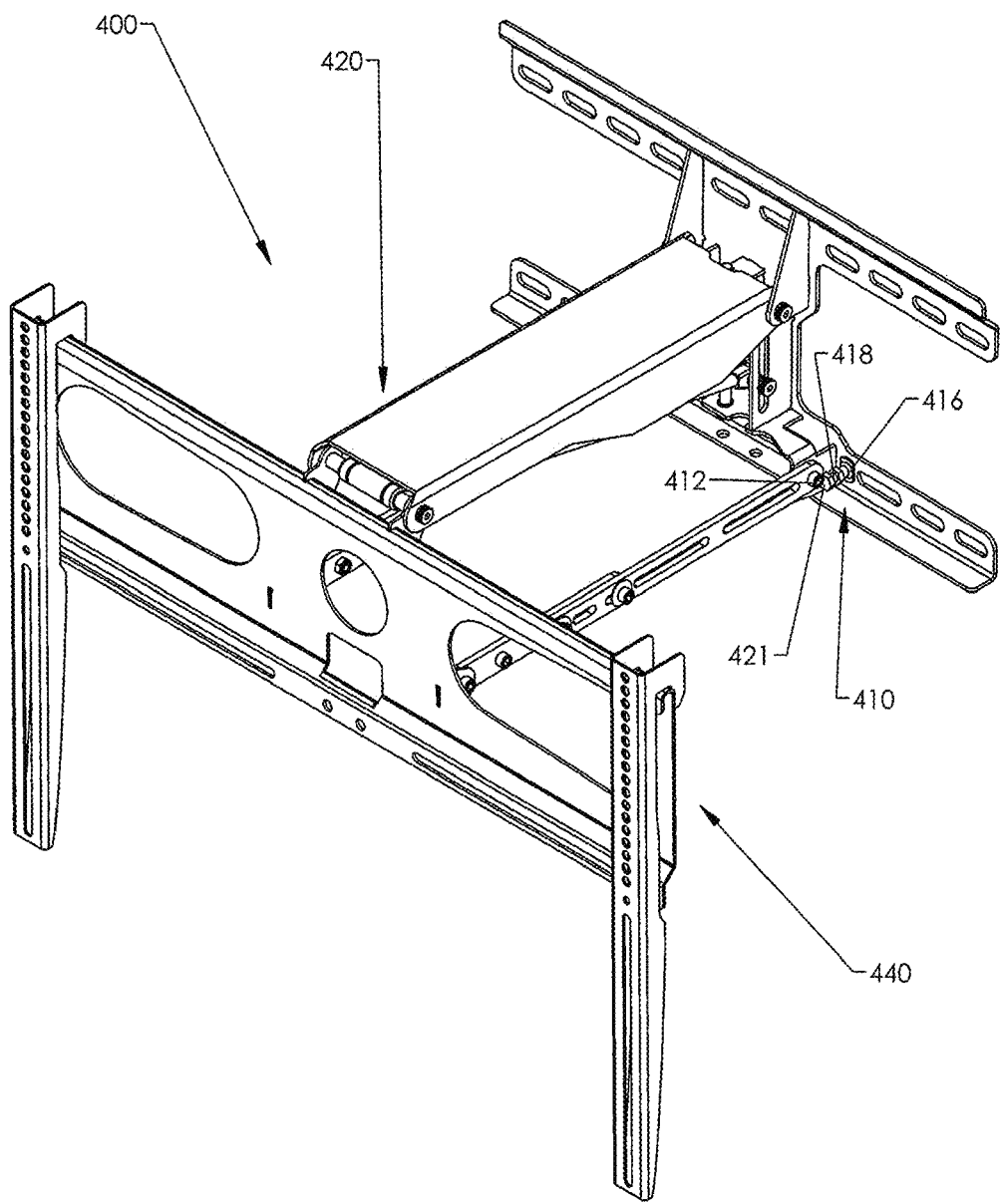
FIG. 18 is an isometric view of a mounting system, in accordance with another embodiment.

FIGS. 18 and 19 show a mounting system 400 that is generally similar to the mounting system 100 discussed in connection with FIGS. 1-17, except as detailed below. A positioner 410 includes a base 416 and a movable member in the form of an adjustment screw 418. The adjustment screw 418 has external threads that engage internal threads along a passageway in the base 416. A head 421 can limit travel of a pivot 412 along a slot 430, illustrated in phantom line in FIGS. 20 and 20A.

Figure 21:
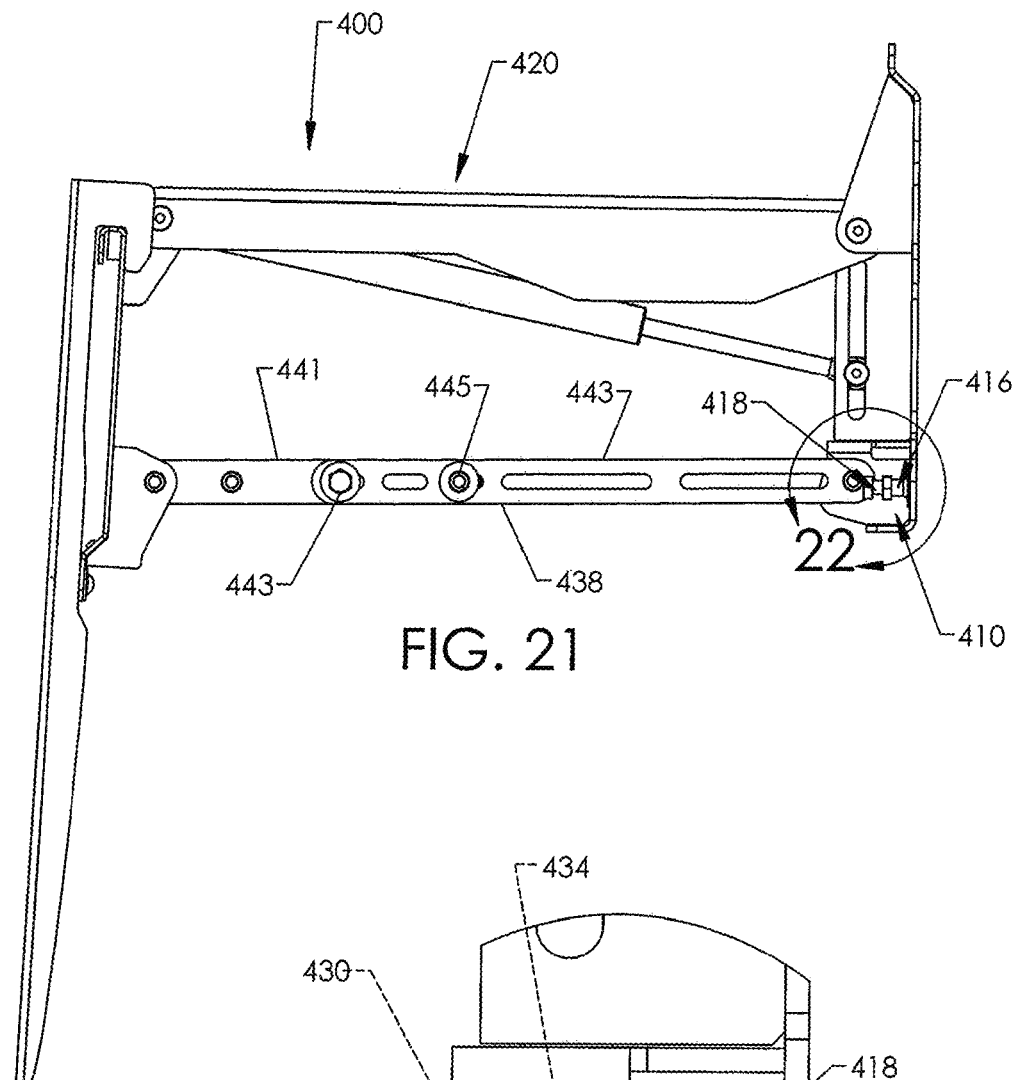
FIG. 21 is a side elevational view of the mounting system of FIG. 18 in a deployed configuration.
Figure 22:
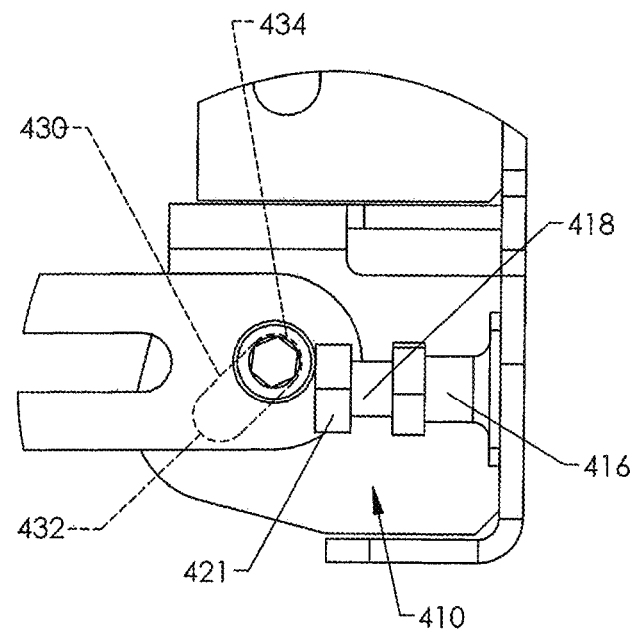
FIG. 22 is a detailed view of the positioner of FIG. 21.

Referring again to FIG. 19, linkage assembly 420 is in a stowed configuration. Pivot 412 is forced towards a forward lower end 432 of the slot 430. As a display bracket 440 is moved downwardly, pivot 412 can slide rearwardly and upwardly along the slot 430. FIGS. 21 and 22 show the pivot 412 positioned at a rearward upper end 434 of the slot 430. Referring to FIGS. 23 and 24, pivot 412 is at the rearward upper end 434 of the slot 430. The load applied by a mounted object pushes the pivot 412 towards the rearward upper end 434.

The illustrated head 421 can be moved by rotating the adjustment screw 418. By moving the adjustment screw 418 into and out of the base 416, tilt of the mounted object can be adjusted. For example, adjustment screw 418 can be moved outwardly away from the wall to tilt the display bracket 440 rearwardly. The link 438 has elongate members 441, 443 that can be moved relative to one another to provide large amounts of adjustment. A locking mechanism 443 can be tightened using a wrench or other tool to lock the linkage 438. In the illustrated embodiment, a pin 445 extends through a slot in the elongate member 443 and a hole in the elongate member 441.

The positioner 410 can function as a mode of operation selector to alternate the mounting system 400 between a four bar linkage system and a five bar linkage system. As shown in FIG. 20A, when the adjustment screw 418 is in an extended position, pivot 412 is translationally fixed. The mounting system 400 thus functions as four bar linkage system. When the adjustment screw 418 is moved into the base 416 to allow translation of the pivot 412 along the slot 430, the mounting system 400 functions as a five bar linkage system.

Figure 25:
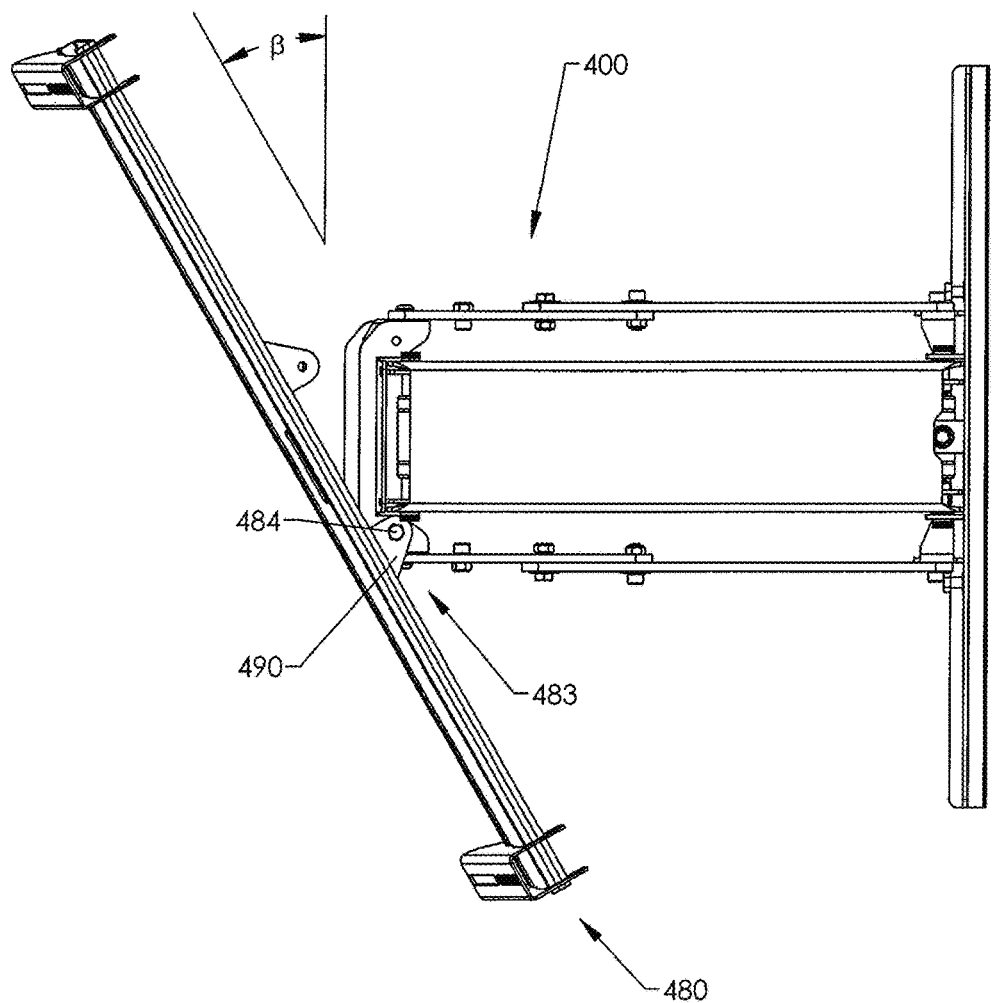
FIG. 25 is a top plan view of the mounting system of FIG. 18.
Figure 26:
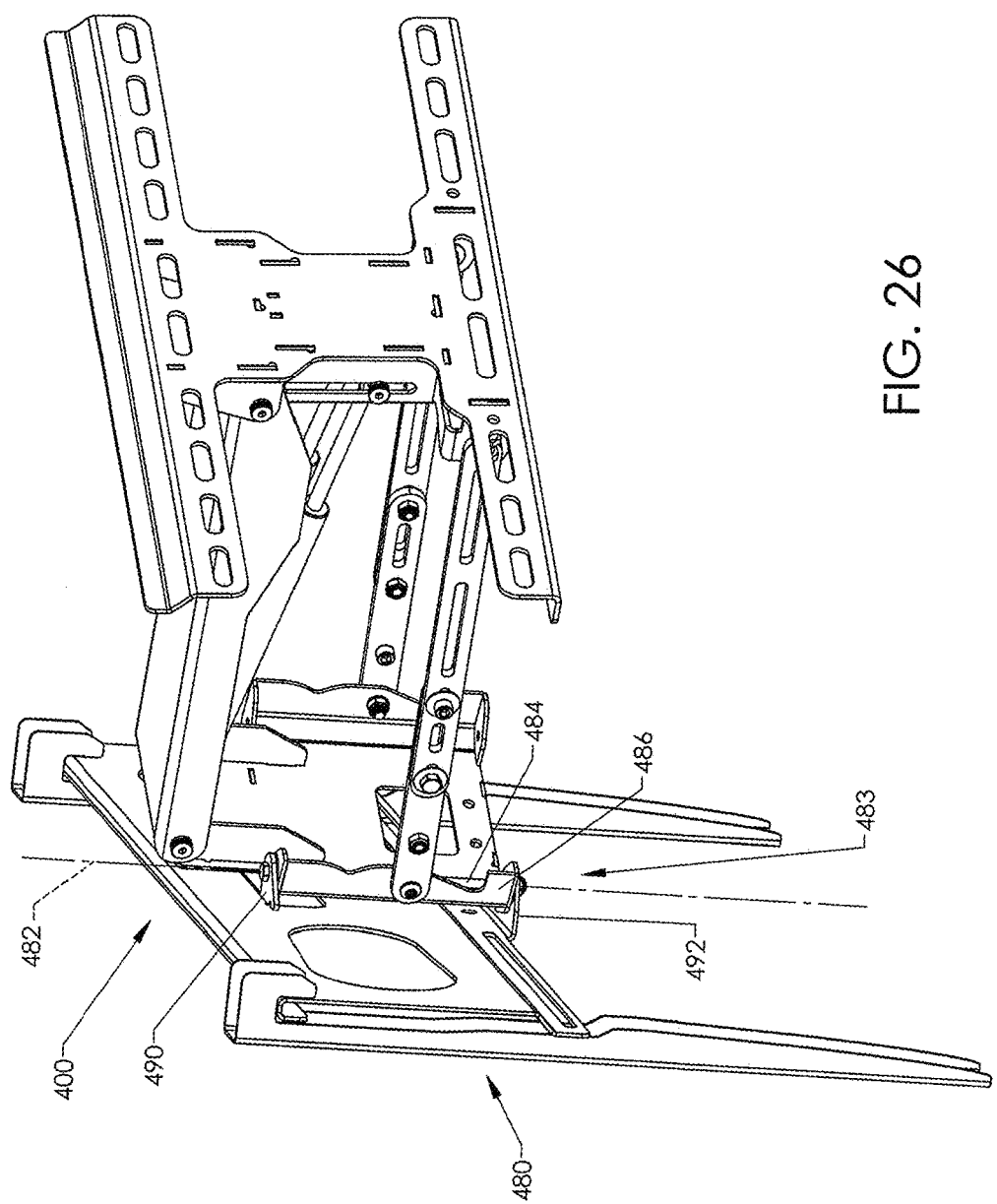
FIG. 26 is a rear, top, and left side isometric view of the mounting system of FIG. 18.

FIGS. 25 and 26 show a display bracket 480 rotatable about an axis of rotation 482, illustrated as a vertical axis of rotation, defined by a swivel mechanism 483. The swivel mechanism 483 includes a pin 484 held by a retainer 486 and mounts 490, 492. The mounts 490, 492 and/or retainer 486 can have slots, holes, or other types of features to allow different types of pivoting or swivel action. The display bracket 480 can be rotated to the left and right an angle β of about ±5 degrees to about ±55 degrees.

Figure 27:
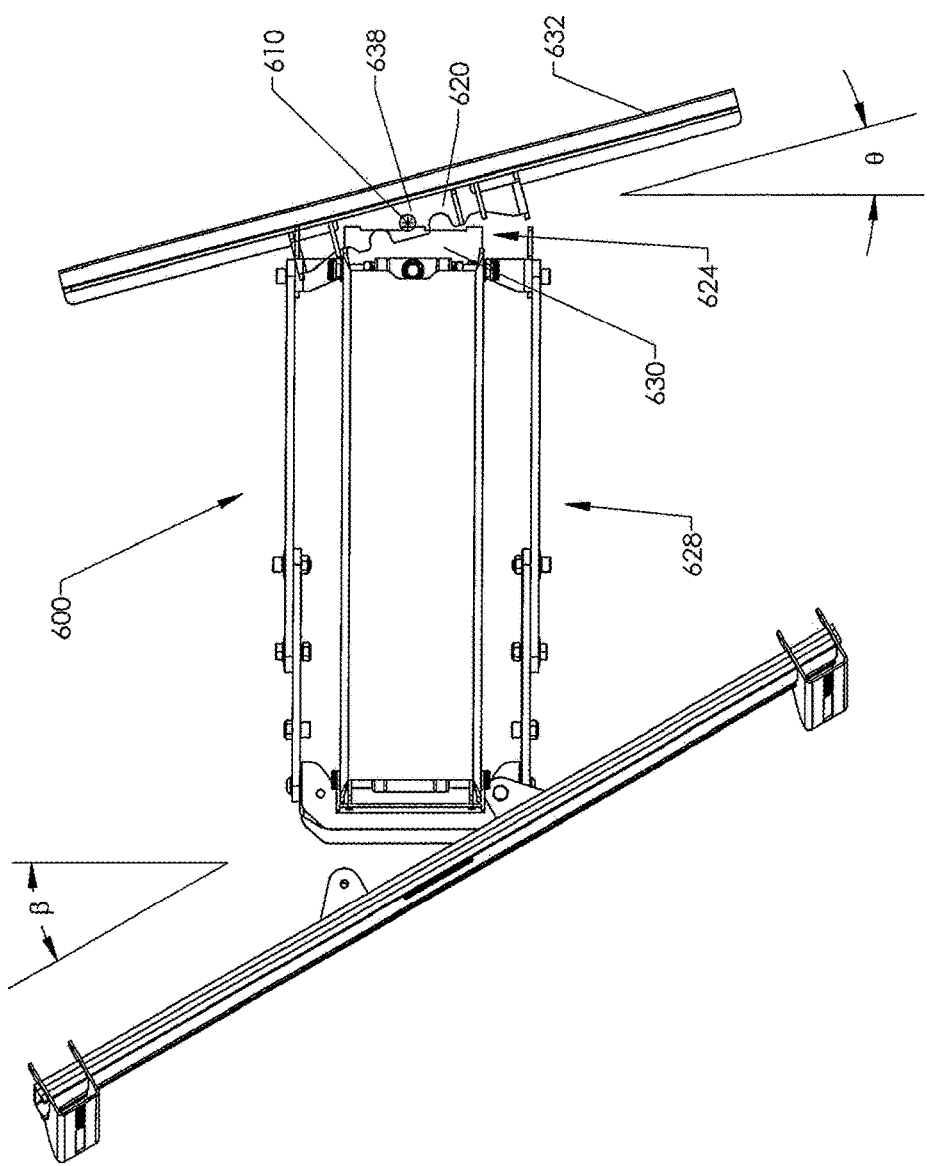
FIG. 27 is a top plan view of a mounting system, in accordance with another embodiment.

Mounting systems can include any number of swivel mechanisms. For example, swivel mechanisms can couple links to the support bracket and can couple the links to the display bracket. The number, positions, and orientations of the swivel mechanisms can be selected to achieve the desired functionality. FIG. 27 shows a wall mount 600 that includes a swivel mechanism 624 that connects a linkage assembly 628 to a support bracket 632. The swivel mechanism 624 includes a pin 638 held by a mount 620. A retainer 630 pivots with respect to the pin 638 to rotate about an axis of rotation 610. The linkage assembly 628 can be rotated to the left and to the right an angle θ of about ±5 degrees to about ±30 degrees. Other angles are also possible, if needed or desired.

Figure 28:
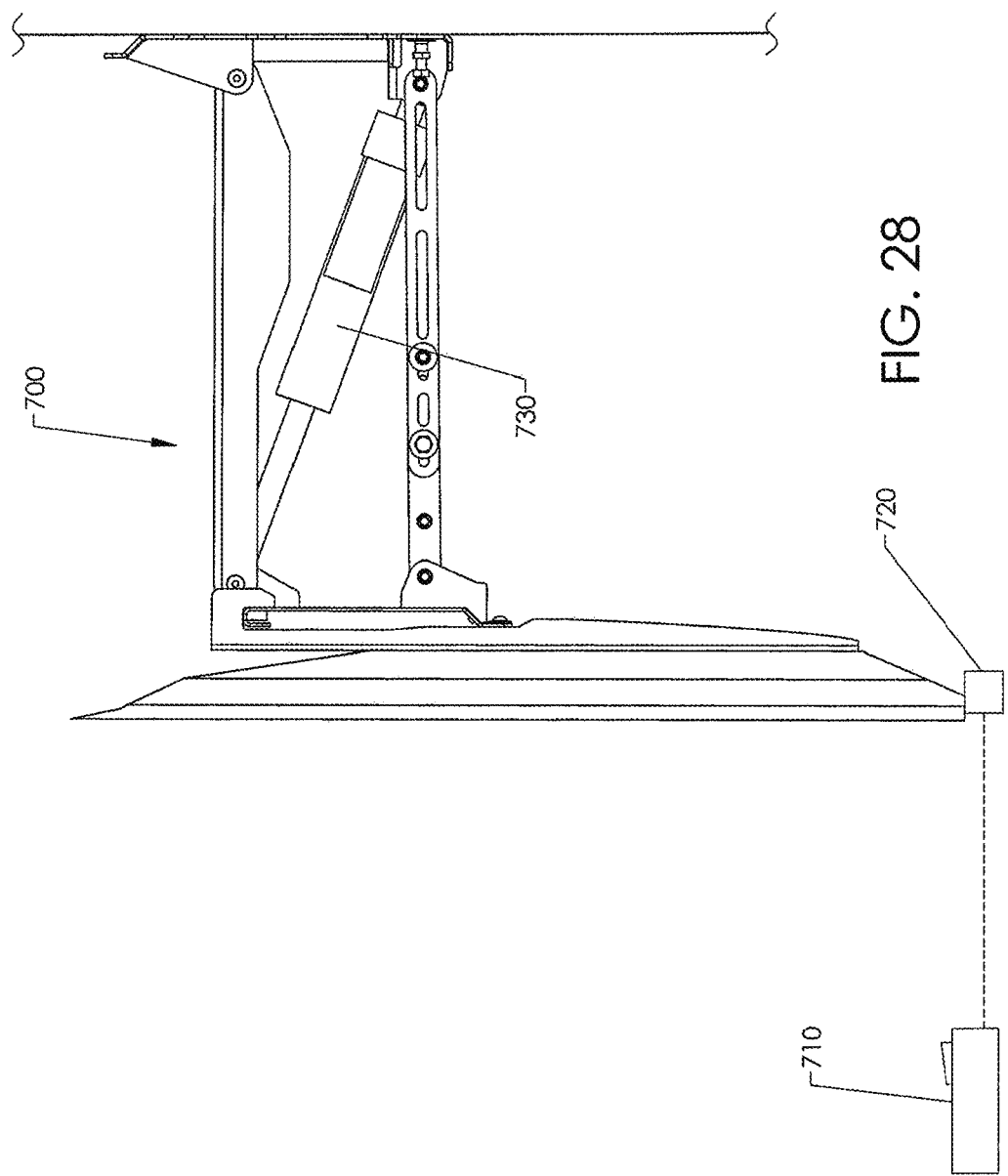
FIG. 28 is a side elevational view of a motorized mounting system, in accordance with one embodiment.

FIG. 28 shows an automated mounting system 700 that can be moved using a controller 510 that communicates with a control device 720. A motorized actuator 730 raises and lowers the television. The control device 720 can include a receiver that is communicatively coupled (e.g., wirelessly coupled, capacitively coupled, inductively coupled, or the like) to a transmitter of the controller 710. A control device 720 can store information in memory and include one or more computing devices or processors. Memory can include, without limitation, volatile memory, non-volatile memory, read-only memory (ROM), random access memory (RAM), and the like. Stored information can include, but is not limited to, settings, weight of mounted object, or the like. Settings can include, but are not limited to, position settings (e.g., stowed positions, lowered positions, intermediate positions, or the like), times (e.g., times to automatically move the object), or the like.

If the mounting system 700 is mounted above a mantel, the control device 720 can be programmed to ensure that the mounting system does not strike the mantel as a television is lowered downwardly past the top of the mantel. At a predetermined time (e.g., after normal bed time), the mounting system 700 can be automatically moved to the stowed configuration such that children cannot easily reach and pull on the television the next morning. In some embodiments, mounting system 700 can be automatically returned to the stowed configuration after the television has been turned OFF for a certain period of time.

The control device 720 can be programmed to move the television 110 to different positions, each having a different indicator (e.g., number, code, etc.). The indicator can be entered using the controller 710. Additionally or alternatively, control device 720 can include input devices, such as a touch pad, a touch screen, a keyboard, or the like. A user can use the input device to move the mounting system 700 into different positions without utilizing any remote. If the control device 720 is hidden behind a television, the user can reach behind the television to access the control device 720 and position the television as desired.

Figure 29:
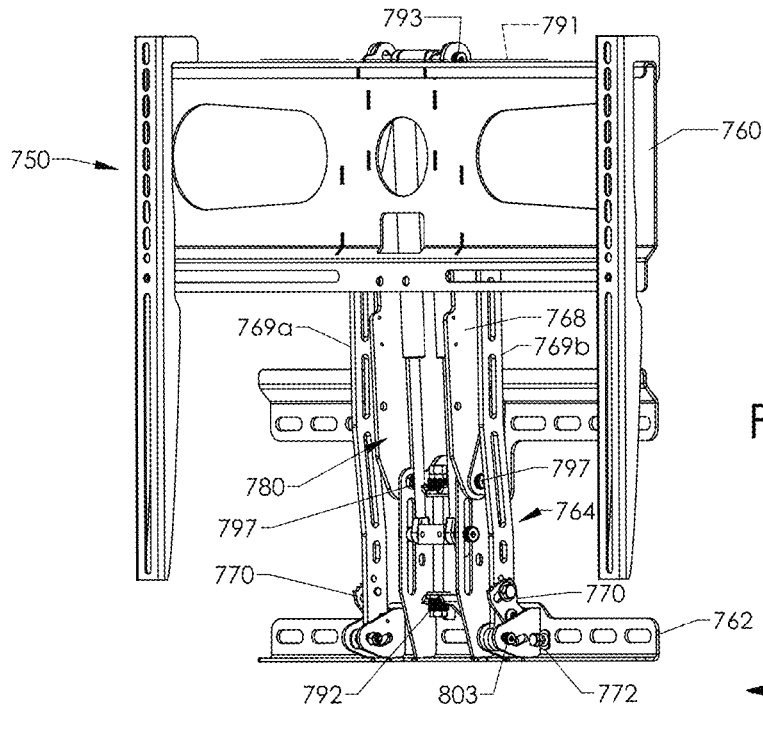
FIG. 29 is an isometric view of a mounting system with a counterbalance assembly and tilt adjustment mechanisms, in accordance with one embodiment.
Figure 30:
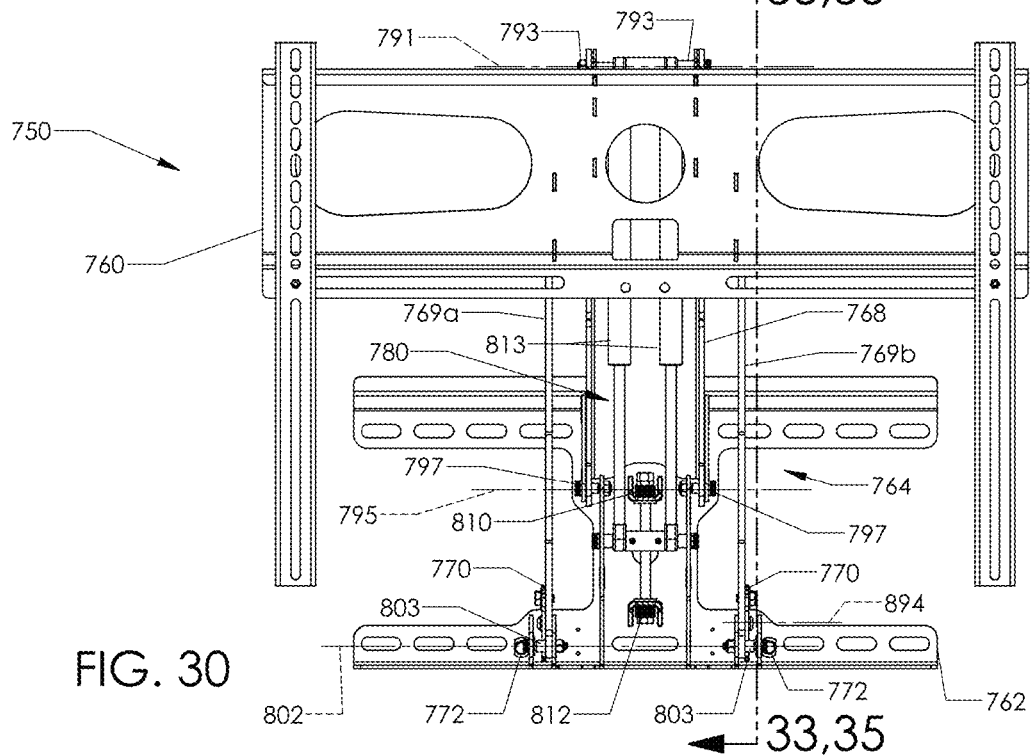
FIG. 30 is a front view of the mounting system of FIG. 29.

FIGS. 29 and 30 are isometric and side views, respectively, of a mounting system 750 in accordance with another embodiment. The mounting system 750 is generally similar to the mounting systems discussed in connection with FIGS. 1-28. The mounting system 750 can be a television mounting apparatus that includes a display bracket 760, a fixed support bracket 762, and a collapsible linkage assembly 764. The display bracket 760 can be configured to hold an electronic display, and the fixed support bracket 762 can be coupled to a mounting structure, such as a vertical wall. The linkage assembly 764 is coupled to the display bracket 760 and the fixed support bracket 762 and can include links that provide, for example, four-bar linkage action, five-bar linkage action, or other types of action. In some embodiments, the linkage assembly 764 includes a main upper link 768 ("upper link 768") and links 769a, 769b (collectively "links 769"). The upper link 768 is rotatable relative to the display bracket 760 about an upper axis of rotation 791 defined by upper pivots 793 and is rotatable about a lower axis of rotation 795 (FIG. 30) defined by lower pivots 797. The links 769 are rotatable relative to the display bracket 760 about an upper axis of rotation 808 (FIG. 31) defined by upper pivots 809 (FIG. 31) and are rotatable about a lower axis of rotation 802 (FIG. 30) defined by lower pivots 803.

FIGS. 29 and 30 show the mounting system 750 including tilt adjustment mechanisms 770, 772 and a biasing mechanism in the form of a counterbalance mechanism 780. The tilt adjustment mechanisms 770, 772 can be used to adjust the positions of the pivots 793, 797, 803 (FIG. 30) and/or 809 (FIG. 31) to position the display bracket 760. The tilt adjustment mechanisms 770, 772 can be operated independently of one another to independently set the tilt of the television at the raised and lowered positions.

Figure 36:
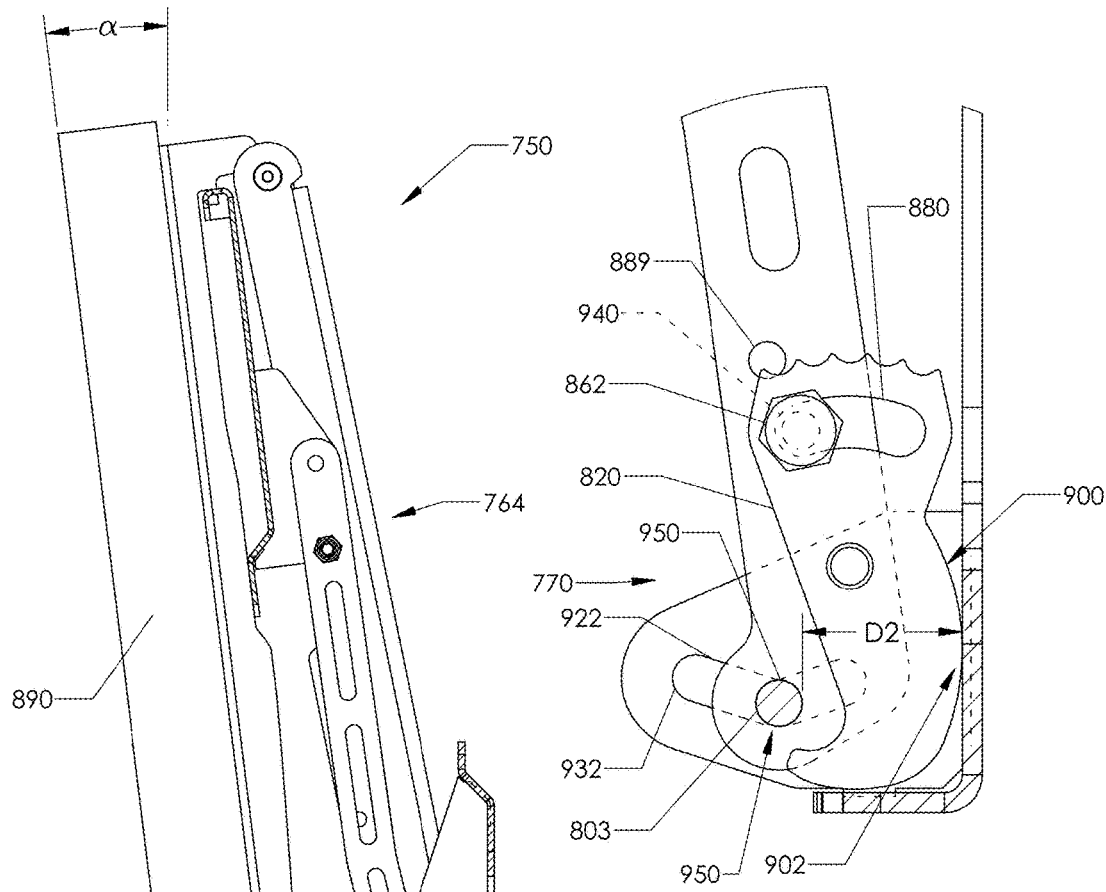
FIG. 36 is a detailed view of the tilt adjustment mechanism of FIG. 35.
Figure 35:
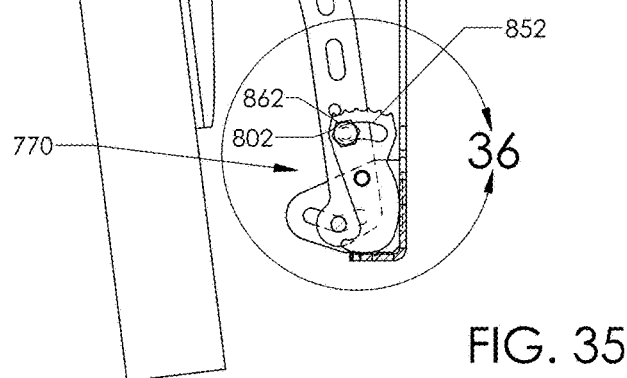
FIG. 35 is a cross-sectional view of the mounting system taken along a line 35-35 of FIG. 30. The mounting system is in a downward tilt position.

The two tilt adjustment mechanisms 770 are operable to set the tilt of the television in the raised position, and the two tilt adjustment mechanisms 772 are operable to set the tilt of the television in the lowered position. For example, a viewer's eyes may be positioned much lower than the television when the mounting system 750 is in a raised or stowed configuration. The tilt adjustment mechanisms 770 can be used to move the pivots 803 to tilt the television downwardly to provide an acceptable viewing angle. FIGS. 31-34 show the tilt adjustment mechanism 770 at a minimum top tilt setting to provide a minimum tilt angle of a television 890 (FIGS. 31 and 33). FIGS. 35 and 36 show the tilt adjustment mechanism 770 at a maximum top tilt setting to provide a maximum tilt angle of the television 890. As the television 890 is lowered, it can gradually tilt to ensure that its screen remains at a desired orientation relative to viewer(s) (e.g., generally perpendicular to a viewer's line of sight).

FIGS. 29 and 30 show the counterbalance mechanism 780 configured to provide a counterbalance force that allows a user to conveniently raise and lower the television but prevents or inhibits movement of the television when the user does not apply a force. The counterbalance mechanism 780, in some embodiments, provides variable resistance to allow a user to smoothly move the television. For example, the counterbalance mechanism 780 can provide a relatively low counterbalance force to allow initial upward or downward movement of the television. Referring to FIG. 30, the counterbalance mechanism 780 can include springs 810, 812 (FIG. 30) that are compressed in response to initial movement of the television. After compressing one of the springs 810, 812, one or more gas spring 813 of the counterbalance mechanism 780 can operate to allow further movement of the television.

FIG. 31 is a side view of the mounting system 750. FIG. 32 is a detailed side view of the tilt adjustment mechanism 770. Referring to FIGS. 31 and 32 together, the tilt adjustment mechanism 770 can include a cam 820 and a tilt adjustment element in the form of a bolt 862 ("tilt adjustment bolt 862") for locking the cam 820. The cam 820 is positioned between a bracket 830 of the fixed support bracket 762 and the link 769b and can contact a back plate 822 of the support bracket 762. Referring now to FIG. 32, the cam 820 can rotate about a pin 860. By way of example, the tilt adjustment bolt 862 can be rotated clockwise such that a bolt head 901 securely holds the cam 820 against the link 769b. The bolt 862 can be rotated counterclockwise (indicated by arrow 903) to release the cam 820. The cam 820 can then be rotated about the pin 860, and once the cam 820 is at the desired position, the bolt 862 can be rotated clockwise to lock the cam 820. Other types of components and mechanisms can be used to lock and unlock the cam 820.

FIG. 33 is a cross-sectional view of the mounting system 750 taken along a line 33-33 of FIG. 30. FIG. 34 is a detailed side view of the tilt adjustment mechanism 770 at the minimum top tilt setting. Referring to FIGS. 33 and 34, the cam 820 can include alignment features 872, an arcuate cam slot 880, and a main body 882. The alignment features 872 can be recesses, notches, indicia (e.g., printed marks), or other features alignable with an alignment feature 889 of the link 769b. The main body 882 can have an opening 892 through which the pin 860 extends to define the axis of rotation 894 (see FIG. 30).

As shown in FIG. 34, the main body 882 can include a contact surface 900. As the television moves upwardly, the contact surface 900 can be brought into contact with a surface 902 of the plate 822 to push a lower end 930 of the link 769b away from the surface 902. The pivot 803 can slide along a curved or V-shaped slot 922 of the bracket 830 to change the orientation (e.g., tilt) of the link 769b. FIG. 34 shows the bolt 862 at an end 930 of the cam slot 880 while the pivot 803 is at an end 932 of the slot 922. The cam 820 can be rotated (indicated by arrow 934) about the pin 860 to allow the pivot 803 to translate (indicated by arrow 935) along the slot 922 and thereby reduce a distance D1 between the pivot 803 and the surface 902.

FIG. 35 is a cross-sectional view of the mounting system 750 taken along a line 35-35 of FIG. 30 after the cam 820 has been moved to a maximum top tilt setting by rotating the cam 820 until the bolt 862 (FIG. 36) is located at an end 940 of the cam slot 880. FIG. 36 is a detailed side view of the tilt adjustment mechanism 770 in the maximum top tilt setting. Referring to FIG. 36, the pivot 803 can be positioned at a lower angled section 950 of the slot 922. The distance D2 can be significantly less than the distance D1 of FIG. 34. For example, distance D2 of FIG. 36 can be equal to or less than 60%, 70%, 80%, 90%, or 95% of the distance D1 of FIG. 34.

FIG. 37 is a side elevational view of the mounting system 750 after it has been lowered (e.g., about seven inches) from its fully raised position. The cam 820 is configured and dimensioned to allow the mounting system 750 to be lowered while the surface 900 of the cam 820 is spaced apart from or engages (e.g., rolls, slides, etc.) along the back plate surface 902.

Referring again to FIGS. 31 and 32, the bottom tilt adjustment mechanism 772 is movable between tilt bottom settings. The tilt adjustment mechanism 772 in the maximum tilt bottom setting can cause the lowered display bracket 760 to be at maximum tilt bottom orientation, and the bottom tilt adjustment mechanism 772 in the minimum tilt bottom setting can cause the lowered display bracket 760 to be at a minimum tilt bottom orientation.0

Figure 39:
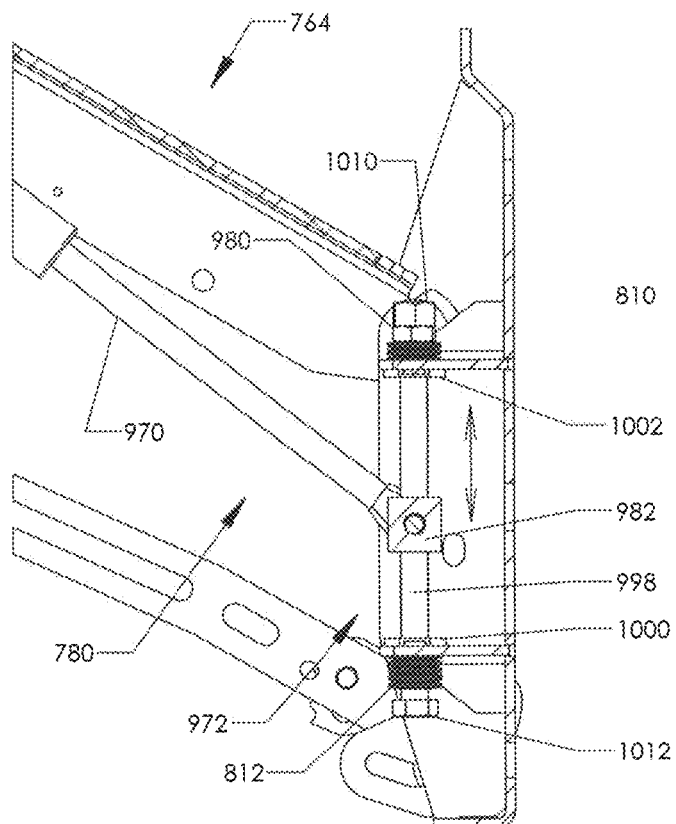
FIG. 39 is a side view of the mounting system in a partially raised configuration.
Figure 40:
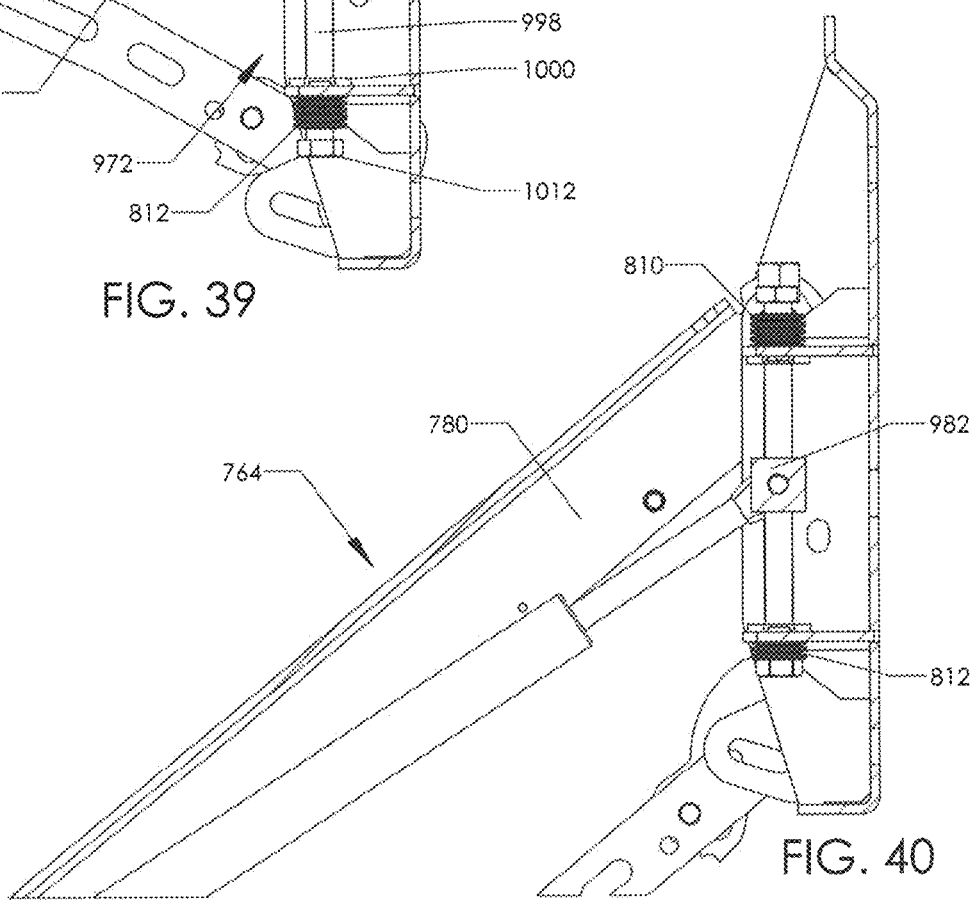
FIG. 40 is a side view of the mounting system in a partially lowered configuration.

FIGS. 39 and 40 show an embodiment of the counterbalance mechanism 780 that can include a counterbalance biasing mechanism 970 and a force adjustment mechanism 972. The counterbalance biasing mechanism 970 can be configured to counterbalance the weight of the television and, in some embodiments, can include a pair of gas springs. Other counterbalance biasing mechanisms can also be used.

The force adjustment mechanism 972 is operable to increase and decrease resistance provided by the counterbalance biasing mechanism 780 and, in some embodiments, also allows movement of the television before extending/contracting the counterbalance biasing mechanism 780. The force adjustment mechanism 972 can include an bolt assembly 980, a carriage or slider element 982 ("carriage 982") coupled to the bolt assembly 980, and springs 810, 812. The bolt assembly 980 can include an externally threaded bolt 998 (external threads are not illustrated) that can be rotated to move the carriage 982 upwardly or downwardly. When the carriage 982 is at a lowered position (e.g., adjacent to or against a lower stop 1000), the counterbalance mechanism 780 can provide a maximum counterbalance force. When the carriage 982 is at a raised position (e.g., adjacent to or against an upper stop 1002), the counterbalance mechanism 780 can provide a minimum counterbalance force. The carriage 982 can be moved to different positions between the stops 1000, 1002 to orient the counterbalance biasing mechanism 780.

The bolt assembly 980 can be moved vertically relative to the lower and upper stops 1000, 1002 to alternatingly compress the springs 810, 812. When the bolt assembly 980 moves downwardly, the upper spring 810 can be compressed between a bolt head 1010 and the upper stop 1002. FIG. 39 shows the spring 810 compressed and the spring 812 uncompressed. When the bolt assembly 980 moves upwardly, the spring 812 can be compressed between a bolt head 1012 and the lower stop 1000. FIG. 40 shows the spring 812 compressed and the spring 810 uncompressed.

Referring to FIG. 39, the upper spring 810 can be in a compressed state and the lower spring 812 can be in an uncompressed state when the linkage assembly 764 extends upwardly. The spring 810 can be further compressed when the mounting system 750 initially moves downward. During this initial movement, the biasing mechanism 970 can remain fixed (i.e., it does not extend/contract a significant amount). As such, the television can be moved due to compression of the spring 810. After fully compressing the spring 810, the biasing mechanism 970 can extend/contract to provide a counterbalance force for most of the travel of the television.

As shown in FIG. 40, when the linkage assembly 764 extends downwardly, the upper spring 810 can be uncompressed and the lower spring 812 is compressed. The carriage 982 can move upwardly to further compress the lower spring 812. The spring 812 can be further compressed when the mounting system 750 initially moves upward. The television can be initially moved due to compression of the spring 812. After fully compressing the spring 812, the biasing mechanism 970 can extend/contract to provide a counterbalance force for most of the travel of the television.

The counterbalance mechanism and any of its components of FIGS. 39 and 40 can be incorporated into any of the mount systems disclosed herein. Aspects of the embodiments can be modified, if necessary to employ concepts of the various patents, applications and publications to provide yet further embodiments. For example, U.S. Provisional Patent Application No. 61/913,195 filed Dec. 6, 2014, U.S. Provisional Patent Application No. 61/396,850 filed Jun. 4, 2010 and U.S. patent application Ser. No. 13/118,297 filed May 27, 2011 are all incorporated herein by reference in their entireties and can be combined with embodiments disclosed herein. Various methods and techniques described above provide a number of ways to carry out the invention. Of course, it is to be understood that not necessarily all objectives or advantages described may be achieved in accordance with any particular embodiment described herein and may depend on the use of the mounting systems. Thus, for example, those skilled in the art will recognize that the methods may be performed in a manner that achieves or optimizes one advantage or group of advantages as taught herein without necessarily achieving other objectives or advantages as may be taught or suggested herein. Furthermore, the skilled artisan will recognize the interchangeability of various features from different embodiments disclosed herein. Similarly, the various features and acts discussed above, as well as other known equivalents for each such feature or act, can be mixed and matched by one of ordinary skill in this art to perform methods in accordance with principles described herein.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, it is not intended that the invention be limited, except as by the appended claims.

What is claimed is:

1. A television mounting apparatus movable between a raised configuration and a lowered configuration, comprising:
   a display bracket;
   a fixed support bracket configured to be coupled to a vertical support structure;
   a linkage assembly rotatably coupled to the display bracket and rotatably coupled to the fixed support bracket such that a television carried by the display bracket is moved from a raised position to a lowered position by moving the television mounting apparatus from the raised configuration to the lowered configuration;
   a pivot rotatably coupling the linkage assembly to the fixed support bracket; and
   at least one tilt adjustment mechanism having an unlocked state for adjusting an amount of translation of the pivot when the television is moved to the raised position and a locked state for setting the amount of translation of the pivot when the television is moved to the raised position,
     wherein the least one tilt adjustment mechanism in the unlocked state is operable to increase or decrease tilt of a link of the linkage assembly relative to the fixed support bracket to set the tilt of the television at the raised position, and
     wherein the at least one tilt adjustment mechanism in the locked state drives the pivot away from a back of the fixed support bracket the set amount of translation when the television is moved to the raised position.

2. The television mounting apparatus of claim 1, wherein the at least one tilt adjustment mechanism has a first top tilt setting and a second top tilt setting, wherein the at least one tilt adjustment mechanism in the first top tilt setting is positioned to contact a surface of the television mounting apparatus to cause the linkage assembly to be in a first tilt configuration at which the television is at a first top tilt orientation, and wherein the at least one tilt adjustment mechanism in the second top tilt setting is positioned to contact the surface of the television mounting apparatus to cause the linkage assembly to be in a second tilt configuration at which the television is at a second top tilt orientation that is different from the first top tilt orientation.

3. A television mounting apparatus movable between a raised configuration and a lowered configuration, comprising:
- a display bracket;
- a fixed support bracket configured to be coupled to a vertical support structure;
- a linkage assembly rotatably coupled to the display bracket and rotatably coupled to the fixed support bracket such that a television carried by the display bracket is moved from a raised position to a lowered position by moving the television mounting apparatus from the raised configuration to the lowered configuration;
- at least one tilt adjustment mechanism operable to increase or decrease tilt of a link of the linkage assembly relative to the fixed support bracket to adjust tilt of the television at the raised position; and
- a pivot rotatably coupling the linkage assembly to the fixed support bracket, wherein the at least one tilt adjustment mechanism includes a tilt cam and a tilt adjustment bolt, and wherein the tilt cam is configured to move the pivot away from the fixed support bracket when the tilt cam contacts the fixed support bracket as the television mounting apparatus moves toward the raised configuration.

4. The television mounting apparatus of claim 1, further comprising a pin that rotatably couples a link of linkage assembly to a link bracket of the fixed support bracket, wherein the pin is positioned in a slot of the link bracket such that the pin translates along the slot when the at least one tilt adjustment mechanism contacts a surface of the fixed support bracket as the television mounting apparatus moves toward the raised configuration.

5. The television mounting apparatus of claim 1, wherein the at least one tilt adjustment mechanism is configured to selectively increase and decrease movement of the linkage assembly to adjust the tilt of the display bracket.

6. A television mounting apparatus movable between a raised configuration and a lowered configuration, comprising:
- a display bracket;
- a fixed support bracket configured to be coupled to a vertical support structure;
- a linkage assembly rotatably coupled to the display bracket and rotatably coupled to the fixed support bracket such that a television carried by the display bracket is moved from a raised position to a lowered position by moving the television mounting apparatus from the raised configuration to the lowered configuration; and
- at least one tilt adjustment mechanism operable to increase or decrease tilt of a link of the linkage assembly relative to the fixed support bracket to adjust tilt of the television at the raised position,
- wherein the linkage assembly includes a first link and a second link, wherein each of the first and second links extends between the display bracket and the fixed support bracket; and
- wherein the at least one tilt adjustment mechanism includes
  - a top tilt adjustment mechanism having a top tilt cam and a top tilt adjustment bolt coupling the top tilt cam to the first link, wherein the top tilt cam is movable between a maximum tilt top setting and a minimum tilt top setting, wherein the top tilt cam in the maximum tilt top setting engages a surface of the television mounting apparatus to position the first link such that the display bracket is at a maximum top tilt orientation when the display bracket is at the raised position, and wherein the top tilt cam in the minimum tilt top setting causes the display bracket to be at a minimum top tilt orientation when the display bracket is at the raised position, and
  - a bottom tilt mechanism movable between a maximum tilt bottom setting and a minimum tilt bottom setting, wherein bottom tilt mechanism in the maximum tilt bottom setting causes the display bracket to be at maximum tilt bottom orientation when the display bracket is at the lowered position, and wherein bottom tilt mechanism in the minimum tilt bottom setting causes the display bracket to be at the minimum tilt bottom position when the display bracket is at the lowered position.

7. The television mounting apparatus of claim 1,
- wherein the at least one tilt adjustment mechanism includes a first tilt mechanism configured for selectively setting the tilt of the television at the raised position;
- a second tilt mechanism configured for selectively setting the tilt of the television at the lowered position; and
- wherein the first and second tilt mechanisms are configured to be operated independently of one another.

8. The television mounting apparatus of claim 1, wherein the linkage assembly has links rotatable about corresponding axes of rotation to move the display bracket between the raised and lowered positions, and wherein the least one tilt adjustment mechanism is operable to move one or more of the axes of rotation.

9. A television mounting apparatus movable between a raised configuration and a lowered configuration, comprising:
- a display bracket;
- a fixed support bracket configured to be coupled to a vertical support structure;
- a linkage assembly rotatably coupled to the display bracket and rotatably coupled to the fixed support bracket such that a television carried by the display bracket is moved from a raised position to a lowered position by moving the television mounting apparatus from the raised configuration to the lowered configuration;
- at least one tilt adjustment mechanism operable to increase or decrease tilt of a link of the linkage assembly relative to the fixed support bracket to adjust tilt of the television at the raised position; and
- a counterbalance assembly including
  - a counterbalance biasing mechanism for counterbalancing weight of the television carried by the display bracket; and
  - a force adjustment mechanism operable to increase and decrease a balancing force provided by the counterbalance biasing mechanism, wherein the force adjustment mechanism is configured to allow movement of the television prior to the counterbalance biasing mechanism operating to allow movement of the television.

10. The television mounting apparatus of claim 9, wherein the force adjustment mechanism includes a bolt assembly, a carriage coupled to the bolt assembly, a first spring, and a second spring, wherein the bolt assembly is movable to compress the first spring when the link assembly extends upwardly from the support bracket and begins to move toward the lowered configuration, and wherein the bolt assembly is movable to compress the second spring when the link assembly extends downwardly from the support bracket and begins to move toward the raised configuration.

11. The television mounting apparatus of claim 10, wherein the first spring is an upper spring positioned to be compressed by the bolt assembly moving downwardly and wherein the second spring is a lower spring positioned to be compressed by the bolt assembly moving upwardly.

12. A television mounting apparatus for holding a television, comprising:
 a display bracket;
 a fixed support bracket configured to couple to a wall;
 an assembly rotatably coupled to the fixed support bracket and carrying the display bracket, wherein the assembly moves relative to the fixed support bracket to move the display bracket between a raised position and a lowered position; and
 at least one tilt adjustment mechanism operable to adjust tilt of a television held by the display bracket at the raised or lowered positions,
 wherein the at least one tilt adjustment mechanism includes a top tilt cam movable between a maximum tilt setting and a minimum tilt setting, wherein the top tilt cam in the maximum tilt setting causes the display bracket to be at a maximum raised tilt position when the television mounting apparatus is at a raised configuration, and wherein the top tilt cam in the minimum tilt setting engages the fixed support bracket such that the display bracket is at a minimum raised tilt position when the television mounting apparatus is in a raised configuration.

13. The television mounting apparatus of claim 12, wherein the at least one tilt adjustment mechanism includes a bottom tilt adjustment mechanism configured to set tilt of the display bracket at the lowered position, and wherein the bottom tilt adjustment mechanism is capable of being operated independent of operation of the top tilt cam.

14. The television mounting apparatus of claim 12, wherein the at least one tilt adjustment mechanism includes
 a top tilt adjustment mechanism with a plurality of settings for reconfiguring the assembly to position the display bracket at a plurality of different top tilt orientations; and
 a bottom tilt adjustment mechanism for positioning the display bracket at a plurality of different bottom tilt orientations.

15. The television mounting apparatus of claim 12, wherein the assembly has links rotatable about corresponding axes of rotation and wherein the least one tilt adjustment mechanism is operable to move one or more of the axes of rotation to adjust the tilt of the display bracket at the raised position and/or the lowered position.

16. The television mounting apparatus of claim 12, wherein the at least one tilt adjustment mechanism has top tilt settings for setting tilt of the display bracket at the raised position and bottom tilt settings for setting the tilt of the display bracket at the lowered position.

17. The television mounting apparatus of claim 12, wherein the at least one tilt adjustment mechanism further includes a locking element configured to lock and unlock the top tilt cam.

18. A television mounting apparatus comprising:
 a display bracket;
 a fixed support bracket;
 an assembly rotatably coupled to the display bracket and movable relative to the fixed support bracket to raise and lower the display bracket, wherein the television mounting apparatus is configured to tilt the display bracket when the display bracket is moved vertical to a viewing location;
 a counterbalance assembly configured to counterbalance weight of a television carried by the display bracket, wherein the counterbalance assembly includes
  a counterbalance biasing mechanism configured to provide a biasing force; and
  a force adjustment mechanism operable to increase and decrease the biasing force provided by the counterbalance biasing mechanism; and
 a tilt setting device operable to set an angle of tilt of the display bracket at a viewing location and is configured to set the angle of tilt independent of a rate of tilting of the display bracket when the display bracket is not proximate to the viewing location and moved vertically.

19. The television mounting apparatus of claim 18, wherein the force adjustment mechanism includes
 a slider element;
 a first spring that is compressed when a bolt carrying the slider element moves in a first direction; and
 a second spring that is compressed when the bolt carrying the slider element moves in a second direction opposite to the first direction.

20. The television mounting apparatus of claim 18, wherein the force adjustment mechanism includes an adjustment bolt assembly, an upper spring, and a lower spring, wherein the adjustment bolt assembly is movable to compress one of the upper and lower springs when the television mounting apparatus moves toward the lowered configuration, and wherein the adjustment bolt assembly moves to compress the other of the upper and lower springs when the television mounting apparatus moves toward the raised configuration.

21. The television mounting apparatus of claim 18, wherein the a tilt setting device is operable to increase or decrease tilt of a link of the assembly relative to the fixed support bracket to adjust tilt of the television at a raised position independent of the biasing force provided by the counterbalance biasing mechanism.

22. The television mounting apparatus of claim 1, wherein the at least one tilt adjustment mechanism adjusts only the tilt of the television when the television is near or at the raised position.

* * * * *